United States Patent
Tye et al.

(10) Patent No.: US 7,718,105 B2
(45) Date of Patent: May 18, 2010

(54) FABRICATING MULTI-COMPONENT SKIN SYSTEMS FOR ROBOTICS AND OTHER APPLICATIONS

(75) Inventors: Bryan S. Tye, Canyon Country, CA (US); Philip John Jackson, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 3 days.

(21) Appl. No.: 12/124,567

(22) Filed: May 21, 2008

(65) Prior Publication Data

US 2009/0289391 A1    Nov. 26, 2009

(51) Int. Cl.
*B29C 39/12* (2006.01)

(52) U.S. Cl. .................... 264/219; 264/259; 264/271.1; 264/277

(58) Field of Classification Search ................. 264/259, 264/271.1, 219, 277
See application file for complete search history.

(56) References Cited

U.S. PATENT DOCUMENTS

| | | | |
|---|---|---|---|
| 2,956,313 A * | 10/1960 | Choice | 264/244 |
| 3,150,218 A * | 9/1964 | Nassour | 264/225 |
| 4,694,231 A | 9/1987 | Alvite | |
| 5,013,508 A | 5/1991 | Troester | |
| 5,215,796 A | 6/1993 | Mueller et al. | |
| 5,543,225 A | 8/1996 | Mueller et al. | |
| 6,072,496 A * | 6/2000 | Guenter et al. | 345/419 |
| 6,771,840 B1 * | 8/2004 | Ioannou et al. | 382/285 |
| 7,113,848 B2 * | 9/2006 | Hanson | 700/245 |
| 7,310,571 B2 | 12/2007 | Kumazawa et al. | |
| 2003/0110540 A1 | 6/2003 | Fukui et al. | |

* cited by examiner

*Primary Examiner*—Kat Wyrozebski
*Assistant Examiner*—Daniel Lee
(74) *Attorney, Agent, or Firm*—Kent A. Lembke; Marsh Fischmann & Breyfogle LLP

(57) ABSTRACT

A method for fabricating a product, such as an amimatronic character, with artificial skin. The method includes providing data defining an exterior surface geometry of the product. A base geometry model of the product is generated based on the exterior surface geometry data, which in turn is used to fabricate a prototype of the product. Then, an exterior skin mold is formed using the product prototype mounted on an alignment block. The method includes fabricating an inner support structure based on the base geometry model having an exterior geometry smaller than the 3D base geometry model by the thickness of the exterior skin. The inner support structure is positioned within the mold with the inner support structure mounted upon the alignment block, which is received in the mold. The product is formed by pouring material for an exterior skin layer into the mold and over the inner support structure.

20 Claims, 11 Drawing Sheets

FABRICATING MULTI-COMPONENT SKIN SYSTEMS FOR ROBOTICS AND OTHER APPLICATIONS

BACKGROUND OF THE INVENTION

1. Field of the Invention

The present invention relates, in general, to creating realistic skin for robots or for use with robotics or other applications in which skin or similar coverings are applied (e.g., robotics used to simulate movement of a human's or a character's face, hands, or the like), and, more particularly, to methods of designing and fabricating skin assemblies such as skin for applying over robotics where such methods are more efficient and repeatable (e.g., are not as reliant upon artist or craftsman time and talents).

2. Relevant Background

Durable materials that are often also flexible and elastic such as plastics and rubbers are used in many applications to create coverings or skins that are applied over an internal physical support structure or skeleton. For example, skins or skin systems are used to create realistic models of humans, animals, and characters, and when combined with robotics, such models may accurately simulate live beings.

Robotics involves the design and use of robots such as to provide programmable actuators or drivers to perform tasks without human intervention, and there have been significant demands for robotic devices (or robots as these terms may be used interchangeably) that simulate humans, animals, and other living beings or characters. These robotic characters are relied upon heavily in the entertainment industry such as to provide special effects for movies and television and to provide robots for use in shows and displays in amusement or theme parks. For example, robotics may be used to provide a character in a theme park ride or show that repeats a particular set of movements or actions (e.g., programmed tasks) based on the presence of guests or a ride vehicle or another triggering event.

It is likely that the interest in robotics will continue to expand in the coming years, and a growing area of interest is how to provide robots that appear more realistic. Many robotics companies have focused on creating robots with software, processing hardware, and mechanical actuators or drivers that allow the robots to behave more like the natural creature that is being simulated. Much work has been done to create robots that can move and even behave similar to humans such as by manipulating objects with mechanical assemblies that behave like hands configured to be human-like. Significant effort has also been directed to providing robots with realistic facial animation such as having a robot open and close its mouth to provide lip synchronization with output audio (e.g., with speech) and by providing particular facial movements including eye movement such as frowning, smiling, and the like. While many advances have been made in realistically simulating the physical movement and facial movement of a character, problems with maintaining a realistic or desired movement or facial animation still occur when the robotics (e.g., internal components of a robot including mechanical/structural portions as well as software, hardware, power systems, and the like) are covered with a skin or skin system. For example, a robot used to simulate a particular creature would be covered with skin or a covering assembly to imitate the natural or desired covering for the creature such as skin and fur/hair for many creatures, clothes for some creatures such as humans or characters (e.g., characters from animated films or television or puppets), or more fanciful covering system such as a metallic suit or any other desired covering.

In simulating humans or human-like characters, the robotics are typically covered in a skin that is fabricated of flexible material to move naturally with the underlying robotics. The skin may be formed of a rubber material or a silicone that is attached or anchored to the mechanical actuators or drivers of the robotic system, and the skin is configured to have an outward appearance similar to the character or creature being simulated by the robot. For example, the facial skins can be formed so as to have an uncanny resemblance to the character (or person) they are imitating, but often this resemblance ends when the attached robotics begin animating the face. The connection or anchoring points become apparent as the skin is pulled or pushed from behind. Additionally, the movement may be undesirably localized with movement only at the appoint of attachment, whereas a human face generally stretches and contracts more as a unit (or the movement is more widespread across the face), e.g., a human's skin around their nose and eyes may move when skin around the mouth moves while a typical robotic skin may only move near the connection point with the manipulating robotics. Efforts have been made to try to create a material for use as the skin for robotics, and especially for a facial skin for human-like robots, but most of these materials still only provide a layer of skin that has a tendency to move at the point of attachment.

Currently, a skin system for a robot is made using a manual process relying on skill and experience of the craftsperson creating the skin and requiring many man-hours to prototype and later fabricate based on the prototype. In the existing process, a sculpture is created, such as from clay or other moldable/shapeable materials, to represent the exterior skin shape (e.g., a person's face, a character from a movie, and so on). The sculpture is then molded, and sheet wax or a layer of clay is laid by hand into this exterior mold to define a desired thickness for the exterior skin layer. An interior core is then fabricated by hand such as by using fiberglass and resin, and this core may be configured to include skin attachment points to allow robotics to later be attached or anchored to the skin. A fiberglass or similar material is used to form a mold from this core, and hard shells, e.g., fiberglass shells to support the skin when the robot is later assembled, are then created from this core mold. An exterior skin can finally be formed by pouring a rubber or other flexible material into the gap between the exterior mold (with the sheet wax removed) and the core mold. After it is set, the skin is removed from the molds and placed on the supporting or hard shell(s) and attached to portions of the robotics.

Skin fabrication has been a cumbersome process and animation (or transfer of mechanical forces applied by the robotics) has often not met the needs of the robotics industry as the unitary skin reacts to the attached robotics in undesirable ways, which may include exposing the underlying robotics, moving only or mainly at the attachment point, and providing limited durability of skin at mounting or contact locations with the robotics. The skin typically is of a single material with one set of physical characteristics such as hardness, flexibility, and the like. Hence, there remains a need for improved methods for fabricating skin systems or assemblies for robotics and other applications that involve covering a support structure with a covering or skin. Preferably such fabrication methods would be less labor-intensive, would support use of multi-layers or components in the skin assembly, and would support design and prototype efforts such as more efficient alteration of component shapes, sizes, materials, and the like.

SUMMARY OF THE INVENTION

The present invention addresses the above problems by providing a method of fabricating an artificial skin system (e.g., an artificial texturing or covering system). In some embodiments, the skin system may be formed from two or more layers or components, and, in some of these embodiments, these components may be formed of a differing material or composition of the same material (e.g., an elastomer) to provide differing hardnesses or other desired physical characteristics for the various skin system components. Generally, the fabrication method includes scanning the object to be fabricated (e.g., a person's head, a character's head and/or body, a component of a product such as a portion of a vehicle, piece of furniture, or the like) and storing this information regarding the object's surface geometry. The method may then use computer modeling (e.g., 3D modeling such as modeling based on computer aided design (CAD) programs or the like) that processes the scanned surface geometry information to create a 3D model of the exterior skin of the object.

The use of a 3D model for the exterior skin (e.g., a modeled sculpture of a face or the like) facilitates later steps including creating a hard shell and various skin system components. Modeling may be used to model drive mechanisms (e.g., robotics) for the skin system components and for interior support components (e.g., inner layers of a skin system of the same or differing hardness). The method further includes fabricating structural or mechanical parts and/or molds such as by using rapid prototyping techniques that utilize data from the 3D modeling steps. Such molds may be used to form interior support components. A skin system can then be quickly and accurately made by pouring the exterior skin layer around and over the rapid prototype core mold and any other previously-formed interior components (such as drive devices and other skin support components with some or all of these components being formed of differing materials or having differing physical characteristics such as differing hardness relative to the exterior skin layer material). A single, integrally-bonded skin system or assembly is thus produced using a single final pour in place of prior practices using multiple molds.

The skin systems described herein are particularly well suited for use as skin for use with robotics such as that may be used to produce a robot head with realistic facial movement or animation but may, of course, be used in nearly any application in which a skin or covering is placed over a rigid or dynamic/movable support structure, frame, or the like. The skin systems are formed according to some embodiments of the fabrication method to produce a single, integral unit in which the components are bonded to each other to move together when manipulated by the attached or contacting robotics. To provide one specific (but not limiting) example, this description describes a skin system that may be used with a robotic head, and this example is provided because with an understanding of such a system those skilled in the art will readily understand many more and less complicated applications of skin systems that may be fabricated using the techniques described herein.

A skin system for a robotic head (or other robotics configuration) may include a flexible mechanism insertion section (i.e., an interior skin component) that transmits and distributes forces from a robotic mechanism. The forces or movement are transmitted to an adjacent backing member or component (i.e., another interior skin component) and to an overlying exterior layer or component (e.g., the outer visible skin layer that may be computer modeled with facial features of a modeled character that has been scanned). In some embodiments, the flexible mechanism insertion section is harder than the flexible exterior layer to cause the exterior skin to move in a desired manner (e.g., more realistically relative to a natural creature) such as in a less mechanical manner while also making the section that contacts the robotics more durable.

The soft flexible backing component in such embodiments may be used to support a substantial portion of the exterior skin and more uniformly distribute forces and stresses that occur during movement of the flexible mechanism insertion section, which may be surrounded by the backing component (e.g., the insertion section may be used to simulate a mouth of a creature while the backing is used to simulate the lower layers of skin, muscle, and the like under the exterior layer). The backing component is formed in some embodiments of a material that may be considered too soft and elastic to be used as the exterior skin but is effective and durable when encapsulated between the flexible exterior skin and a rigid supporting shell that is used to support and house the robotics. The backing component may be attached to the flexible mechanism insertion section such as with adhesive.

A unitary skin system is formed by pouring the exterior skin layer or component over the other skin system components (e.g., pouring a fluid resin of elastomer material (or filling/placing a material) such as silicone into a mold containing the rigid shell, the attached soft backing component, and the insertion section bonded to the backing component). The fabrication method described allows the exterior skin layer to be quickly modeled and, in some cases, a two-step molding technique is used to provide a "rough" casting that can be refined by an artisan to create a final exterior mold (e.g., by adding features not accurately provided by scanning and 3D computer modeling to create the "rough" or initial exterior mold). The fabrication method facilitates additional prototyping and altering of the interior components as these can be sized and shaped and modified to suit the modeled exterior skin layer (e.g., the exterior and interior dimensions of this layer are stored in memory with the data defining the exterior skin layer model). Further, each of these interior components (which may include driving robotics and/or structural features) has its defining data including shape, dimensions, and materials stored in memory for use in additional modeling/design efforts.

More particularly, a method is provided for fabricating a product, such as robot head, with an artificial skin system. The method includes providing in memory a set of digital data that defines an exterior surface geometry of the product and a model of an alignment block. The method also includes using a modeling tool (e.g., a 3D CAD-based application) running on a computer to generate a 3D base or core geometry model of the product based on the exterior surface geometry data set. Typically, the 3D base geometry model is configured for mounting on the model of the alignment block, and the method continues with creating a prototype of a product based on the 3D base geometry model. Then, an exterior skin mold is formed using the product prototype mounted on the alignment block. The method includes fabricating an inner support structure based on the 3D base geometry model, with the inner support structure having an exterior geometry selected to be smaller than the 3D base geometry model by an offset distance (which is selected to define the thickness of the exterior skin layer). The inner support structure is positioned within the exterior skin mold such that the inner support structure is mounted upon the alignment block and the alignment block is received in a matching recess in the exterior skin mold. The product is formed by pouring material such as a liquid elastomer for an exterior skin layer into the mold to flow about the inner support structure.

According to some aspects, the method may include providing the exterior surface geometry data set by performing a laser scanning of exterior surfaces of the product and, if necessary, processing the resulting cloud data set. The method may include forming the exterior skin mold by first forming an initial mold using the product prototype, creating a sculpt assembly in the initial mold, modifying the sculpt assembly by sculpting to add or alter features, and then second forming of the exterior skin mold (or final mold) using the modified sculpt assembly. Further, the fabricating of the inner support structure may include modeling, with the 3D modeling tool or the like, a structural shell with an exterior shape at least partially matching the 3D base geometry but accounting for the offset distance. The structural shell includes an outer wall that defines an interior void space. Fabricating of the inner support structure may include designing, again with the 3D modeling tool or other devices, at least one inner skin component positioned in an opening in the outer wall of the structural shell (but in some cases two or more inner skin components are provided). Then, the inner skin component is made from a material that will later bond with the material of the exterior skin layer during or after the pouring of the exterior skin. The method may include creating a model of a mold for the inner skin component with the modeling tool, and the mold and the structural shell may be manufactured by providing the mold model and structural shell model to a rapid prototype machine that is then operated to fabricate the inner skin component mold and the structural shell. Additionally, the method may include providing a drive mechanism or robotics configured for mating with the inner skin component and for positioning in the void space of the structural shell (e.g., by designing all or portions of these components based on the other modeled/designed inner support structure components). The fabricating of the inner support structure may include bonding the inner skin component to the structural shell, and, in some embodiments, the material of the inner skin component is harder than the material of the exterior skin layer after it sets/solidifies, so as to provide a force receiving component in the inner support structure. The pouring of the exterior skin layer may include providing a volume of a fluid elastomer that flows within a cavity of the exterior skin mold over the force receiving component, with an inner surface of the exterior skin component becoming integrally bonded to the force receiving component as the fluid elastomer solidifies.

DETAILED DESCRIPTION OF THE PREFERRED EMBODIMENTS

Figure 1:
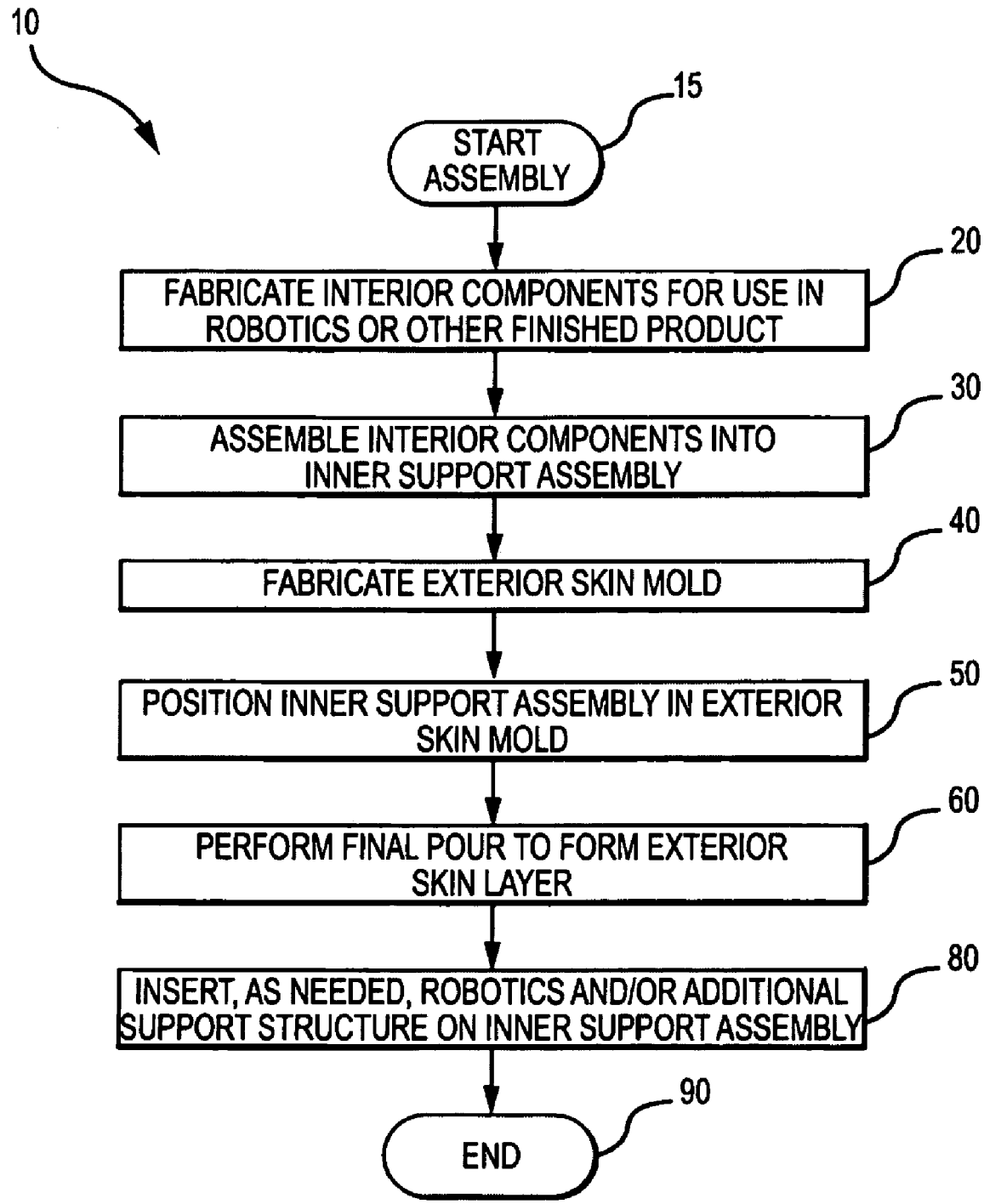
FIG. 1 is a flow diagram for a process or method of assembling a product, such as a robotic character, having an exterior skin layer and interior skin or other components.

Briefly, embodiments of the present invention are directed to fabrication methods for products or items that include skin systems (e.g., robots or other structures/assemblies that incorporate skin systems) for providing extremely realistic looking facial movement or animation or providing a desired covering of an internal structure and/or moving parts. The following description highlights the use of the assembly and fabrication methods with robotics-based products and devices and, particularly, a robotic head, but the concepts described are readily extended to other applications in which an internal structure or support is covered with a skin or covering. The following discussion begins with a general overview of one useful skin system and then proceeds to a discussion of a general assembly method for a product or apparatus using such a skin system. The resulting product and its components (e.g., a unitary exterior skin layer, multiple interior skin components, rigid structural components, and robotics or driving mechanisms) are then described in more detail. A discussion is then provided of a fabrication technique that can be used to implement an embodiment of the invention providing details of how the assembly of the product with the skin system can be created and designed/prototyped.

In some embodiments, a skin system is provided that is durable and easily maintained and that is designed to simulate a head and face of a robot such as human face, a character face (e.g., a puppet face, an animated creature face, or the like), a creature face, or the like. The skin system is typically fabricated from two or more flexible components with differing physical characteristics such as two or more components or layers formed from the same or differing materials but having two or more hardnesses to achieve a desired effect. The following description highlights the use of such a skin system with robotic assemblies, but the skin system is also useful in other applications in which it is desirable to cover a still/rigid or a dynamic/movable frame, support structure/skeleton, or other object with a skin system having more than one hardness (or more than one durability/flexibility). Such other applications are considered within the breadth of the following description and claims.

For example, the inner support structure or assembly may include a component as part of an overall skin system for receiving mechanical forces (e.g., a force receiving component) or this component may be thought of as the anchor component or the manipulated component as it typically is adapted for mating with driving or manipulation members of a robotics system (e.g., mouth driving mechanism of robotics system may be attached to this member). Since this component needs to resist wear and transfer forces, it may be formed of a flexible material with a relatively high hardness value. Other components in the skin system contact this force receiving component such as an intermediate support component or backing and an overlying or exterior component or layer that extends over all other components (e.g., the exterior skin layer). These components may be formed of a flexible material but with a relatively low hardness. The overlying or exterior skin layer may further act to bond all the components of the skin system together into a single unit.

In the assembled product or apparatus (e.g., the robotic character), the skin system may be supported by structural members including an inner shell or frame formed of rigid materials (such as plastic or fiberglass) to simulate rigid support found in nature such as a skull or other bone. The robotics may be housed within this support shell and extend through the shell to engage the skin system, e.g., the force receiving component, to manipulate the skin system to create desired animation such as facial expressions or speech. Use of multiple hardnesses for the joined skin components in the skin system can result in more realistic movement of the skin such as less obvious point source pushing and pulling where the robotics engage the skin system and such as skin distal to the contact points moving in unison (e.g., the skin system better simulates human and other skin in that it moves more as a unit rather than in small isolated patches where a force is being applied).

FIG. 1 illustrates an assembly process 10 for a robotic or other apparatus that includes a skin system. The method 10 starts at 15 such as by selecting an object to be a basis for creating the robotic apparatus such as by selecting a person, an animal, a character model, or the like. At the starting step 15, the robotic apparatus may also be designed including deciding whether the skin system will simply be a single exterior layer or whether it will include one or more inner structural components (such as a force receiving component and a soft backing component). The design typically will also include design of a rigid support structure and, when appropriate, design/selection of robotics or driving mechanisms. As will become clear, the design and prototyping of these components is greatly facilitated by the fabrication method of embodiments of the invention.

The assembly 10 continues at 20 with fabrication of the interior components (or inner support structure/assembly) for use in the robotics or other finished product. Again, this step 20 is facilitated by the fabrication techniques of the invention including 3D computer modeling of these components (which may be considered part of the designing of step 15) based on surface geometry information obtained by scanning the selected object or subject for modeling. Fabrication at 20 may include creation of molds using 3D computer modeling of the inner structural components and rapid prototyping techniques (e.g., molds printed using data stored in memory that define the modeled components). At 30, the formed interior components are pieced together to create the inner support structure or assembly. Step 30 may include assembling a rigid or flexible shell or frame and then placing inner skin system components upon receiving surfaces of the hard shell or frame.

At 40, the method 10 continues with fabrication of an exterior skin mold. As explained below, step 40 may be a two-part process in which a first or initial mold is created using the surface geometry of the subject model or base object (e.g., a person, an animal, a character, or the like). The surface geometry data may be obtained by electronic scanning of the subject model or base object and entering/importing this information to a design or modeling software program (such as a computer aided design (CAD)-based tool or the like). This initial exterior mold may be used to perform step 40 or, in other cases, an initial or "rough" shape is formed in this initial exterior mold, and the initial shape is modified manually, such as by a sculptor, an artisan, or worker, to add fine detail. Next, a final or second exterior skin mold is formed around the modified or detailed sculpture or shape.

At 50, the inner support assembly is positioned within the exterior skin mold (e.g., the final or second exterior skin mold). To facilitate accurate positioning, a location or alignment block may be mounted onto the initial/rough shape or modified/detailed shape or sculpture prior to forming the second exterior skin mold. This location block may be included in the design of the components of the inner support structure such that these components may be attached in proper arrangement or configuration upon this location or alignment block (e.g., by attaching the hard shell or frame to the block). At 60, the method 10 includes performing a final pour of material such as silicon or the like into the exterior skin mold to form the exterior skin layer. In some embodiments, the skin is formed over the inner support structure such that the skin layer is a unitary piece that may be viewed from nearly any angle without a seam or opening being visible. The thickness of the skin layer is defined by the space between an inner surface of the exterior skin mold and outer surfaces of the inner support structure (and, in some cases, this thickness is reduced by contraction or shrinking of the poured material as it hardens/sets).

At 80, the location block may be removed and robotics/drive mechanisms and/or additional support structure may be inserted into the inner support assembly. Step 80 may include attaching such inserted components to one or more portions of the inner support structure (e.g., to the force receiving component of the skin system, to the hard shell/frame, and the like). Note, the location block and inner skin system components and the hard shell/frame are fabricated without gaps, holes, or the like that may provide a flow path for the poured material of the exterior skin layer. Further, additional brackets that are permanent or temporary may be inserted into the shell or frame to provide support of softer components during the pour 60 (e.g., to better withstand pressures or forces applied by the poured material). The method 10 then ends at 90 with or without additional finishing steps and or mounting of the skinned product onto additional structure/supports (e.g., mounting a robotic head onto a body, a robotic hand onto an arm, or the like).

Figure 2:
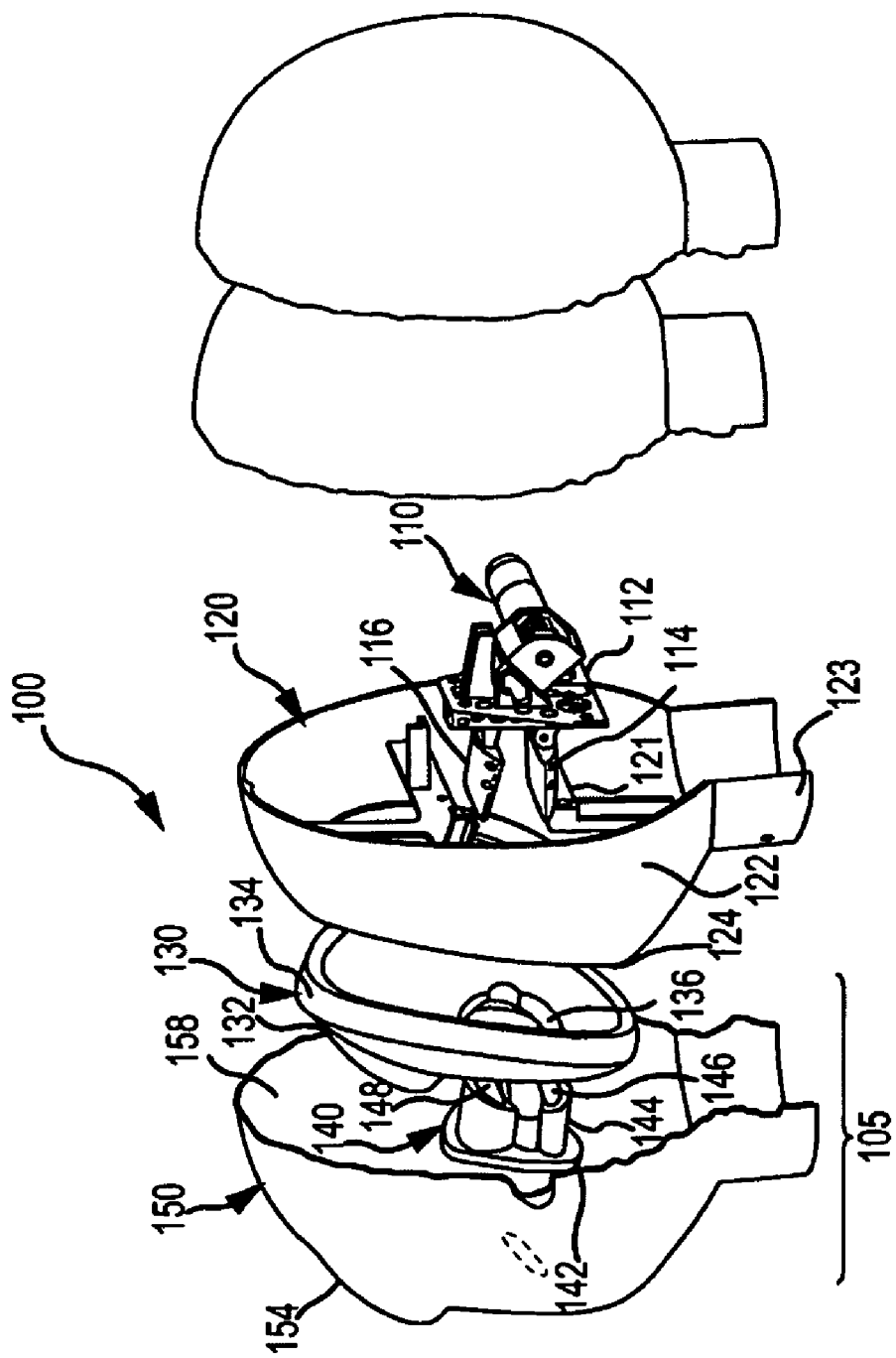
FIG. 2 is an exploded side view of a robot head (e.g., a product or apparatus that can be assembled with the method of FIG. 1) with a skin system according to an embodiment of the invention such as but not limited to a skin system with two or more flexible components that may have differing hardness.
Figure 3:
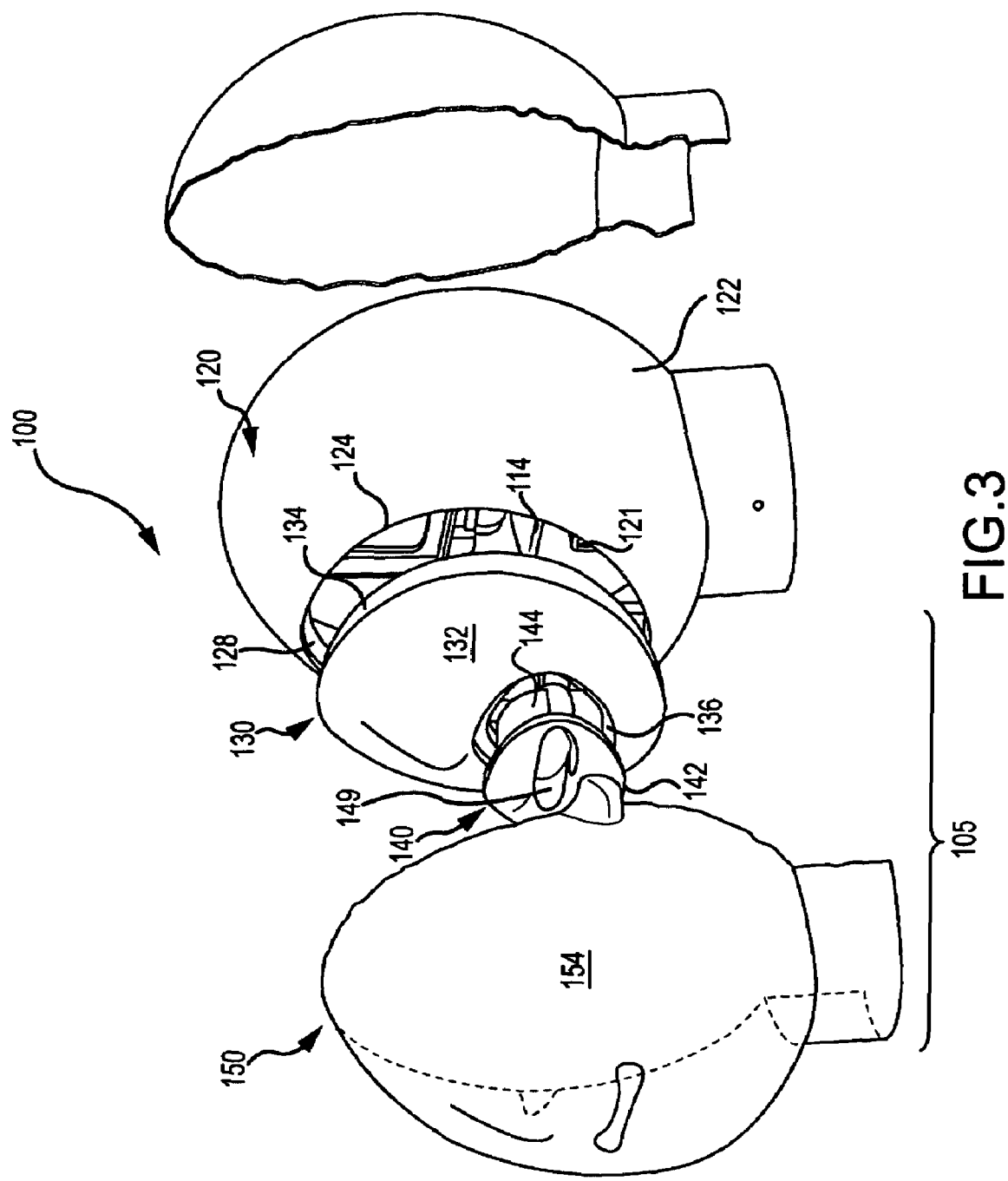
FIG. 3 illustrates a side view similar to that of FIG. 2 showing more detail of the mating of the flexible components of the skin system and placement within a receiving opening or surface of a supportive shell or frame.

FIGS. 2 and 3 illustrate an embodiment of a robot head or robotic system 100 (e.g., a "skinned" or assembled product or apparatus such as may be formed with the method 10 of FIG. 1) that includes a robotic assembly 110, a hard shell or structural support frame 120, and a skin system 105. The robotic assembly or robotics 110 is shown in simplified form and may include typical robotic software, hardware, and mechanical mechanisms and linkages used to perform programmed or controllable movements. In this regard, the robotics 110 includes a mounting plate 112 for attaching it to structural frame 120 upon mounting member 121. The robotics 110 in this example may be a mouth mechanism or a mechanism for simulating movements of a mouth, and, as such, includes manipulators or skin driving members 114, 116 (e.g., upper and lower jaw or roof of mouth and bottom of mouth simulating elements extending from driving devices in robotics 110). The particular arrangement and configuration of the robotics 110 is not limiting to the invention as the skin systems fabricated according to techniques of the invention, such as the method 10 of FIG. 1 or method 700 of FIG. 7, may be used with numerous robotics or other devices such as those that impart force to provide a desired response (or look and feel) or that simply provide a skin/cover over a structural assembly. As shown, the robotics 110 is enclosed in the shell 120, and, typically, the robotics 110 is inserted into the shell 120 before or, more typically, after the pouring of the exterior layer or component 150 of the skin system 105 (such as after removal of a location or alignment block shown as element 310 in FIG. 4).

A hard shell or support frame 120 is included in the robot head 100 to provide the structure of the head and to provide physical support for the soft skin system 105 and to contain and hide the robotics 110. The hard shell 120 is rigid and is typically formed of a material such as a plastic (such as a polycarbonate/ABS mix or the like) but metals and/or alloys may also be used to form shell 120. The shell 120 includes a sidewall 122 generally in the shape of the head (or skull) of the creature being simulated by robot head 100, with the head 100 being a relatively generic character such as may be used to imitate a puppet or character such as for use in an amusement park. The sidewall 122 extends down into a neck portion 123 of the shell 120, with the neck portion 123 having an opening for receiving and mounting to an alignment or location block (shown as 310 in FIG. 3). The shell 120 functions to support the skin system 105, and, in this regard, the sidewall 122 includes an opening 124 for receiving a component 130 of the skin system 105. Specifically, a receiving surface 128 extends from the sidewall 122 at the gap or opening 124 to receive the component 130, and this surface 128 may be tapered to guide the component 130 into the shell 120 but block or limit travel (e.g., to cause the component 130 to be substantially flush with the outer surface of the sidewall 122). Component 130 may also be bonded to shell 120 at surfaces 128 and 134 to seal cracks or seams that may allow later poured material such as liquid silicone to leak through to the interior of the shell 120. Prior to pouring of exterior skin layer 150 additional support brackets may also be provided within shell 120 so as to support the backing component 130 and/or force-receiving component 140 from pressures or forces that may deform or push in these components.

The skin system 105 includes two or more portions or layers that have differing hardness but this will not be the case in all skin systems formed using the inventive fabrication methods described herein. These portions may be formed from the same or differing materials and, in some embodiments, are bonded together to move as if formed as an integral part. As shown, the skin assembly 105 is formed from three components 130, 140, 150, but, in other cases, fewer or more components may be utilized. Further, all of the components may have differing hardness values or some of the parts may have the same or similar hardness values with the important aspect being that at least two of the components have different hardness values.

In the illustrated example, the skin system 105 includes three components or layers 130, 140, 150. The first component is a soft, flexible backing component or layer 130. The soft flexible backing component 130 is used in the robot head 100 as a thick, soft layer that is positioned behind the exterior component or layer 150, which is formed with details (such as facial details to simulate a particular character, human, or creature) to provide the head 100 with a desired external or visible appearance. The backing component 130 may be the softest portion of the skin system 105, but this is not required as some configurations may be arranged differently such as with the backing being one of the harder portions. In some cases, though, the use of a backing component 130 that is relatively soft provides a more desirable effect because its softness allows it to be effective to support the exterior component or layer 150 while also allowing it to move relatively easily with adjacent components such as component 140, which is attached to the robotics 110 via members 114, 116.

For example, if the robot head 100 is being used to imitate a puppet with a soft foam head it may be useful for the whole face to move when the mouth moves, and this is achieved in the head 100 because the soft backing component 130 moves relatively freely with the force receiving component 140 (or the mouth). This causes the supported portions of the exterior component (or the detailed "face" of the robot 100) to also move because, in part, the component 150 is bonded to the outer surface 132 of component 130 as explained below (e.g., due to pouring or forming the exterior component 150 upon the component 130).

The soft flexible backing 130 may be created with a mold (e.g., a mold that is modeled based on scanned/determined surface geometry of skin 150 and fabricated using rapid prototype machines or other techniques) and pouring a variety of materials into that mold to form its shape or casting the part. The poured materials are generally elastic materials, but this is not required to practice the invention as it may be useful to provide a more rigid component with one or more components that are rigid. However, typically the components of the skin system 105 will be elastic and flexible to allow manipulation by robotics 110. The materials used for the components 130, 140, 150 are chosen to be compatible to bonding such as bonding of component 130 to 140 with adhesive and then bonding of components 130 and 140 to component 150 during the molding and pouring processes. The materials may be the same or differ for the components 130, 140, 150, with some embodiments choosing the same material but differing hardnesses for the three components 130, 140, 150. The material may be a plastic or, more typically a polyurethane or rubber. In some embodiments, the component 130 is formed of silicone such as a silicone foam or a silicone foam with additives such as a silicone and urethane foam. As noted above, the backing component 130 is typically bonded to shell 120 about its periphery such as at surfaces 128 and 134 with adhesive or the like such that when the outer layer or component 150 is formed through pouring liquid does not seep into the interior of the shell 120.

As discussed, it may be desirable to have the components have differing hardnesses to achieve desired wear and desired movements. Hardness herein is intended to relate in part to flexibility or level of elasticity with components 130, 140, 150 having a higher value of hardness being less elastic (and vice versa). Hardness is generally the resistance of a material to localized deformation and may apply to deformation from indentation, scratching, cutting, or bending. For elastomers, rubbers, and some polymers (that may be used for components in skin system 105), hardness may be thought of as the resistance to elastic deformation of the surface. In one embodiment, component 130 is chosen to be have the lowest hardness value of the three components 130, 140, 150 of system 105 and may have a hardness on a "00" scale as measured with a durometer that is less then about 40 with some embodiments using silicone, urethane, or the like that has a hardness on a "00" scale measured with a durometer in the range of about 1 to 25 (such as about 20 which is softer or more susceptible to elastic deformation than the rubber in a typical rubber band and some cases using a hardness of 5 or less on the "00" scale such as a hardness of about 3). The fabrication techniques described herein allow more efficient fabrication of the inner components such as 130, 140 as well as the exterior layer 150 such that it is more efficient to try or to prototype various materials and/or hardnesses (or other physical characteristics) as new molds can be quickly printed or formed to test skin system or shell configurations.

The component 130 includes a mating surface 134, which may be beveled as shown, that abuts or contacts the receiving surface 128 of the shell sidewall 122. As shown, the softer backing component 130 acts as the interacting portion of the skin system 105 with the shell 120, but this is not required to practice the invention (e.g., a harder component such as component 140 may abut the shell 120). The component 130 acts as a backing or support for the exterior component or shell 150, and, as such, it may be configured with a face or outer surface 132 that has similar contours and/or topography as the layer 150. In this way, the facing surface 132 may better support shaped surfaces of the layer 150 such as the nose shown on facing surface 132 and exterior surface 154 of layer 150. Also, as shown, the component 130 includes a gap or hole 136 for receiving and mating with the component 140, but, in some embodiments, the component 130 may not encircle the component 140 (e.g., may simply be placed adjacent an edge of the component 140). In the illustrated case, the component 140 is acting as the mouth of the head 100 and component 130 is acting as lower surfaces or layers of a face (e.g., the muscles, tendons, bones, and the like under the face adjacent the mouth), and, in this case, it is desirable to have the soft component 130 surround the sides of component 140 so as to have the surrounding portion of the face move with the mouth of the robot head 100.

Component 140 of the skin system 105 is typically the hardest component as it functions to receive the manipulators 114, 116 of the robotics 110. In other words, the component 140 is the force receiving/transmitting portion of the skin system 105 and preferably has a higher hardness value to have better wear characteristics and also to more effectively transfer the transmitted movement from the robotics 110 with less absorption of this force as would be the case with a very elastic or soft material (e.g., the component 130). In other embodiments, several portions of the skin system 105 may be provided to contact and interact with the robotics 110 (e.g., a plurality of anchor locations for the robotics) such as may be provided on a face at or near eyebrows or other locations to simulate separate facial muscles. The illustrated force-receiving component 140 includes a front wall 142 that abuts and supports a portion of the exterior layer or component 150 (e.g., the lips in this case) and a receiver portion 144 with channels 146, 148 for receiving manipulators 114, 116.

During operation of the head 100, the robotics 110 move in a programmed or controllable manner that, in turn, causes the component 140 to move, and, particularly, a gap or void space 149 is provided to facilitate movement of the receiver 144 to open and close the void space 149 (e.g., to open and close the mouth of the head 100). Of course, the gap 149 is not required to practice the invention and its inclusion and shape, size, and other features may be varied to practice the invention (e.g., to suit the desired action and appearance of the head 100 and the exterior layer 150 and its features). Note, though, that recessed surfaces in the components 130 and 140 act to receive poured liquid material used to form the exterior component 150 and assist in shaping the component 150 and also providing bonding sites between the components with depth which may provide better/stronger bonding.

Again, the component 140 may be made of the same material as the component 130 or of a differing material such as the elastic materials listed earlier. Typically, it is preferable that the materials used be selected to bond to the exterior component 150 when it is formed to provide a bond that generally extends over the entire exposed surfaces (e.g., over facing element 142, into void 149, and over outer or face surface 132) of these components 130, 140 upon formation of component 150 (e.g., during a "final" pour step). The flexible mechanism insertion section or component 140 is used to transfer mouth mechanism 110 movements smoothly to the face 150 (and component 130). It is also preferably selected to have an elasticity and toughness that makes it durable enough to withstand the repetitive movement of the mechanism or robotics 110 while being soft enough to maintain or provide a realistic action and/or look when it moves with the robotics 110. As with component 130, component 140 may be made using any of a number of well-known methods such as making a mold of the desired shape to allow pouring to cast or produce the component 140. The material may be chosen from those listed for the component 130 such as a silicone, a urethane, a rubber, or even some plastics. The hardness of the component 140, though, is typically greater than the adjoining component 130, and in some embodiments, it has a hardness between 30 to 90 as measured by a durometer on the "00" scale or a greater hardness such as up to 85 as measured by a Model D Durometer (or on the "D" scale) or even more (as may have to be measured on the Rockwell R scale). In one embodiment, the hardness of the component 140 is in the range of 40 to 60 on the "00" scale (e.g., about 40 to 45 measured hardness) with a value of between 45 to 55 being useful in some cases (e.g., about 48 was used in one implementation of skin system 105). Again, these hardness values are only provided for reference and are not limiting of the invention and skin system fabrication techniques.

Figure 6:
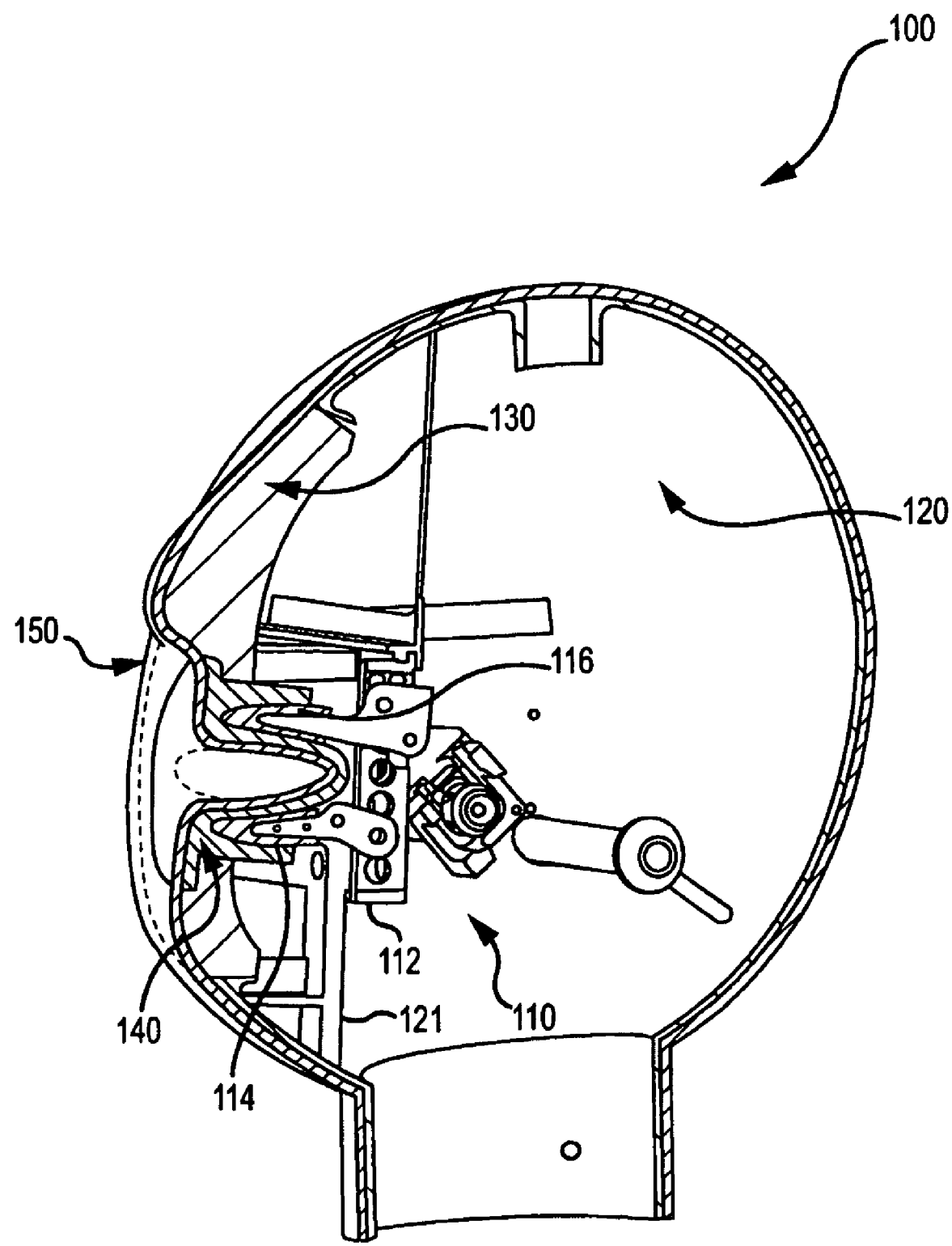
FIG. 6 illustrates the head of FIG. 2 with a cross sectional view showing the various layers of the skin system after assembly (e.g., after the robotics or drive mechanisms are inserted into the inner shell or frame with the manipulators or drive elements of a mouth mechanism or robotics assembly inserted into or attached to the force transfer component or layer of the skin system)

In the skin system 105 of FIGS. 2 and 6, an exterior layer or component 150 is provided that functions as the exterior skin layer of the head 100 (e.g., the portion that is visible to observers). The exterior layer 150 may be formed last by pouring or forming over the other components 130, 140 of the skin system 105 as well as the shell 120 when these components that provide in inner support structure or assembly are placed in an exterior skin mold (such as with location block 310 attached to the walls of the mold to center or position the inner support structure components relative to the inner surfaces of the exterior skin mold walls). The exterior component 150 includes an outer surface 154 that provides, in the head example, facial features of the robot head 100 such as lips, a nose, ears, and the like, and these features or details of such features may be added or refined manually by an artisan manipulating or sculpting on a shape or formable object (such as clay) formed in a first or initial mold (e.g., a mold created from a core geometry modeled based on surface geometry data obtained by scanning a base or subject object).

The component 150 also includes an inner surface 158 that contacts and bonds at least to the other skin components 130, 140 and, in some embodiments, to the shell 120 (although bonding to the shell 120 is not required to practice the invention as the layer 150 typically extends about the entire shell 120 and connection only in the front or face portion is acceptable in many applications). The exterior component or layer 150 has a thickness that typically will be relatively small such as less than 0.25 inches and more typically less than about 0.125 inches, but it may have a range of thickness to provide topology or features (such as ears, lips, and the like). In thinner portions or regions, the layer 150 relies upon the backing 130 and component 140, at least in part, to support and/or provide its shape.

The exterior layer 150 is typically fabricated by a final pour after assembly of the other components of the head 100 (e.g., of the inner support structure or assembly). This technique of pouring the skin or exterior layer 150 last allows the details of an original sculpt (that is used to create an exterior mold) to be picked up or created in the layer 150. For example, a molding process may be followed in which fluid resin (e.g., a thermosetting, thermosetting, thermoplastic, or other resin with additives provided to cause the resin to solidify) is poured into a mold or frame into which other skin components 130 and 140 have been placed. Concurrently, the pouring of the skin layer 150 causes the skin system 105 to become intrinsically bonded together (such as a crosslink or other bond between the materials of the differing components) such that the three components 130, 140, and 150 as well as shell 120 (which may be attached to the periphery of component 130) are attached to each other to behave as an integral unit or system (e.g., the layer 150 is bonded to the component 130 and also to the component 140 during the final mold process).

Figure 5:
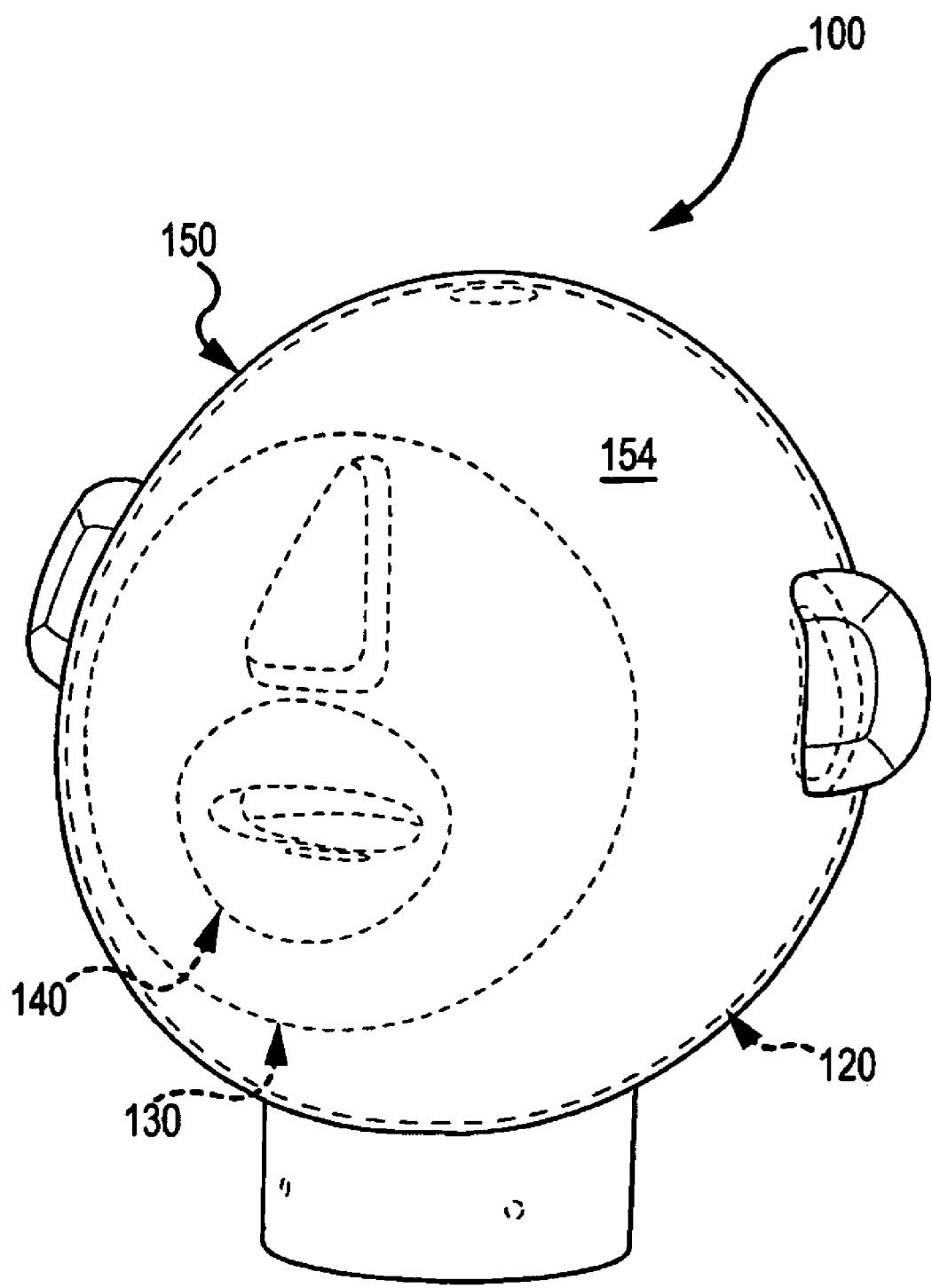
FIG. 5 is a perspective view of the robot assembly of FIG. 4 after application of the exterior component or layer of the skin system.

The layer 150 may be formed of any of the elastic materials discussed thus far and may be the same or a different material as one or both of the components 130, 140. In one embodiment, the exterior skin layer 150 is chosen to have a desired color and/or texture (e.g., of the character or being that is simulated by head 100) and may be formed of silicone or another elastic material such as rubber, urethane, plastic, or the like. The hardness is typically chosen to be less than the force transmitting component 140 but greater than the soft and very elastic backing component 130. For example, the exterior skin layer 150 may have hardness value of less than about 50 on the "00" scale when tested with a durometer or more typically less than about 40 (such as between 30 and 40 with a hardness of about 36 used for the skin layer 150 in one implementation of a puppet head 100 and a hardness of about 30 to 32 used in another case). In one embodiment, a backing plate and/or brackets (not shown in FIG. 6) were provided within the interior of the shell 120 during the pouring/formation of layer 150 to support the soft, flexible backing component 130. In this embodiment, the backing plate acts as support in the final pour of the component 150, e.g., pouring of silicone or the like. The mold builds up pressure from the poured material of the component 150 as the silicone or other poured material is forced through the mold, and the backing plate keeps the component 130 from collapsing inward (e.g., generally in its final position as shown in FIGS. 5 and 6). Other backing structures may optionally be used to practice the invention. In the fabrication of one embodiment of the product, the inventors discovered the desirability for structures to support components, such as component 130, during the filling process. The soft flexible backing and the force-receiving component, for example, that are bonded to the hard shell are flexible, and they may not have enough strength to hold their position during the final filling of the mold. To solve this problem, the inventors created and installed a removable structural or backing assembly. This assembly preferably can be disassembled and removed through the opening of the hard shell after the exterior layer has cured and can then be reused for subsequent parts or product fabrication.

In some skin system designs or skin systems fabricated according to the invention, two or more components have differing hardness (and, hence, elasticity and response to applied forces) within the integral skin system or assembly. In the example of FIGS. 2 and 3, three components 130, 140, 150, each having a differing hardness, are utilized in skin system 105. These components may be formed of differing materials, be formed using molds formed for that part or by other fabrication processes, and be supported with a hard, rigid shell 120 or used in an application without such support. Further, the assembly process may vary to provide the system 105 and a robot head or other higher-level assembly utilizing the skin 105, such as head 100 of FIGS. 2 and 3. However, the following description provides a useful assembly process that may be used to form skin system 105 and head 100.

Figure 4:
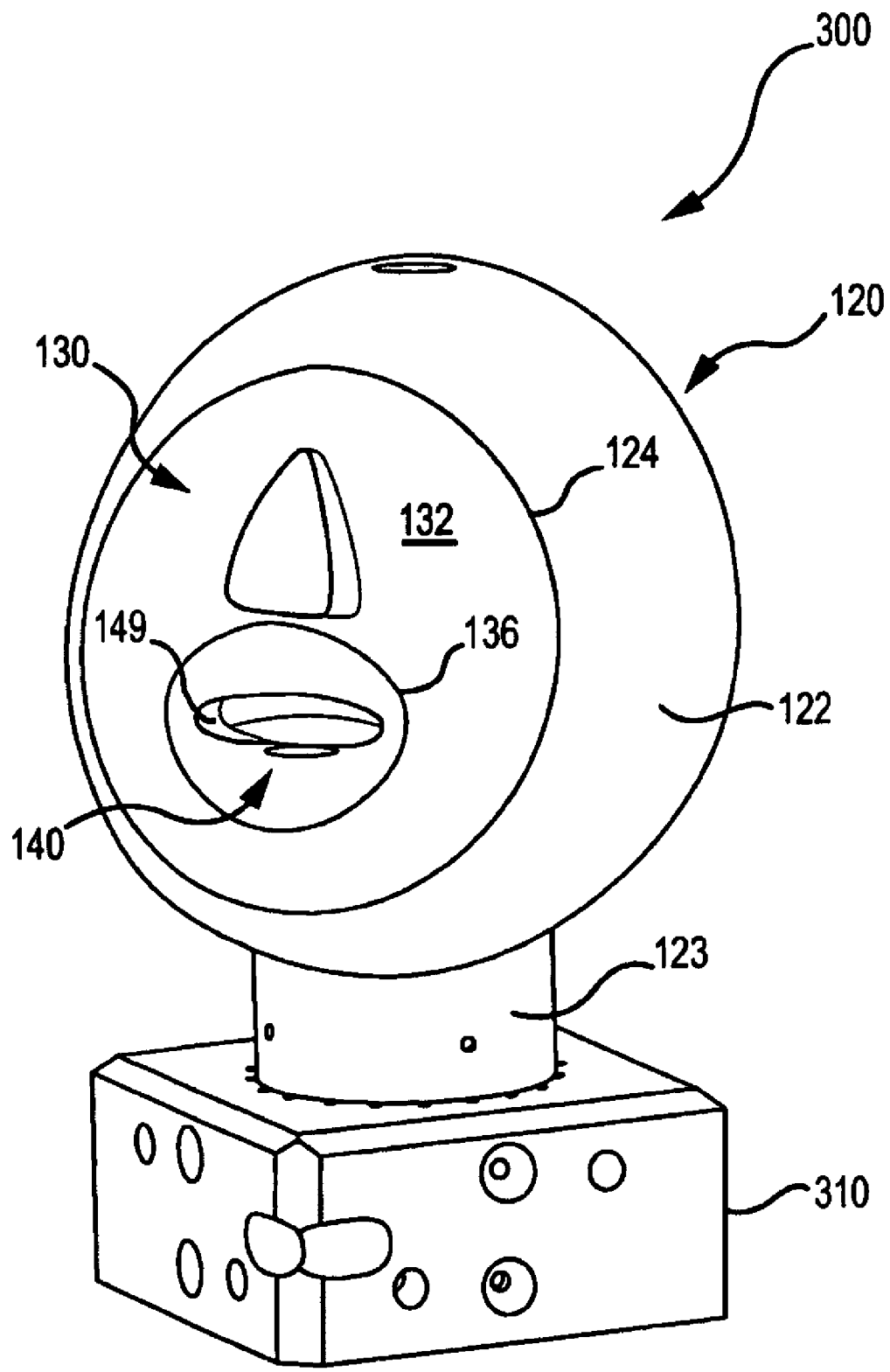
FIG. 4 is a perspective view of a robot head assembly during fabrication, e.g., prior to formation of the exterior component or layer of the skin system.

FIG. 4 illustrates a partial fabrication assembly 300 of the head 100. As shown, the hard shell 120, the soft backing component 130, and the force receiving/robotic interaction component 140 have been formed and are being assembled into assembly 300. The shell 120 may be attached at the neck section 123 to location block or mounting structure 310, which can function to physically support the assembly 300 during assembly and also to place the assembly 300 within a mold for pouring of the exterior layer or skin component 150. During assembly, the hard shell 120 is bonded to the soft flexible backing 130 using an adhesive to mate surface 134 to sidewall 122 receiving surface 128 (shown in FIGS. 2 and 3). Similarly, the backing component 130 is attached to the force-receiving component 140 (e.g., flexible mechanism insertion section) using an adhesive. The adhesive may be any sealant appropriate to substantially permanently attach the components together (e.g., such that one or both of the parts have to be destroyed or damaged to disassemble or some lesser bonding amount may be useful in some cases) and that is selected for the particular materials used for these components of the assembly 300. In this way, the components 130 and 140 are physically supported by the shell 120 and component 140 is able to move in response to robotics 110 while transmitting forces to soft backing component 130. In one embodiment, the adhesive is a sealant used with silicone (or molded liquid silicone rubber) such as an RTV silicone adhesive sealant (one part acetoxy cure silicones, oxime-cure silicones, or otherwise) distributed by Dow Corning such as their 732 Multi-Purpose Sealant or the like. Of course, other adhesives may be used such as a polyurethane adhesive, an epoxy-based adhesive, a rubber adhesive (pressure or the like), a cyanoacrylate, an acrylic (light cure, two-part, or the like), and/or other adhesives that function to affix or destructively bond the components 120, 130, and 140 together in assembly 300.

FIG. 5 illustrates a next step in the assembly process in which the robot head 100 is nearly complete. After forming the assembly 300, the bonded assembly 300 is inserted into an exterior skin mold fabricated for the head 100 and a final pour is performed to create the exterior layer 150 of skin assembly 105. The components 120, 130, 140 are created with dimensions slightly smaller than the adjacent surfaces of the mold (as defined or modeled by the 3D computer modeling process described below based on scanned surface geometry data) such that when the assembly 300 is positioned (e.g., by mounting with the block 310 to the mold walls) in the mold there is a gap all the way around the assembly 300 for the exterior skin pour (e.g., liquid silicone or other elastomer or elastic material with a desired hardness when cured or solidified), with the "gap" defining the thickness of the component 150. By pouring the exterior component over the bonded components 120, 130, 140 of assembly 300, the exterior layer or skin component 150 becomes bonded to the skin components 130, 140 to form an integral or unitary skin assembly 105 that moves together when manipulated by robotics 110. Particularly, the inner surface 158 of exterior component 150 is bonded to the outer or facing surface 132 of the backing component 130 and to the outer portion 142 of the robotics insertion component 140.

FIG. 6 illustrates the assembled robot head 100 after the pouring or formation of exterior layer 150 and insertion of robotics 110. As shown, the exterior layer 150 abuts and is bonded to the soft flexible backing component 130 as well as the flexible mechanism insertion component 140. The backing component 130 may be supported by a portion of the shell 120 as shown in this example but this is not required to practice the invention. The robotics 110 is mounted via mounting element 112 to hard shell 120 on frame 121. In this position, the manipulators 114, 116 are inserted into the component 140 of the skin system 105 after pouring of the exterior skin layer 150 such that the component 140 moves with the manipulators 114, 116, and such movement is transferred to the attached backing component 130 as well as the overlying and attached flexible exterior component 150. Again, the hardness ratings or values of the three components 130, 140, and 150 may be selected to achieve a desired effect for a particular implementation of the head 100. This may involve an amount of testing and modeling to achieve a preferred result, but typically the backing component 130 has the lowest hardness followed by the durable exterior component 150 and then the mechanism insertion or force receiving/transmitting component 140, which is the hardest component in the skin system 105.

Figure 7:
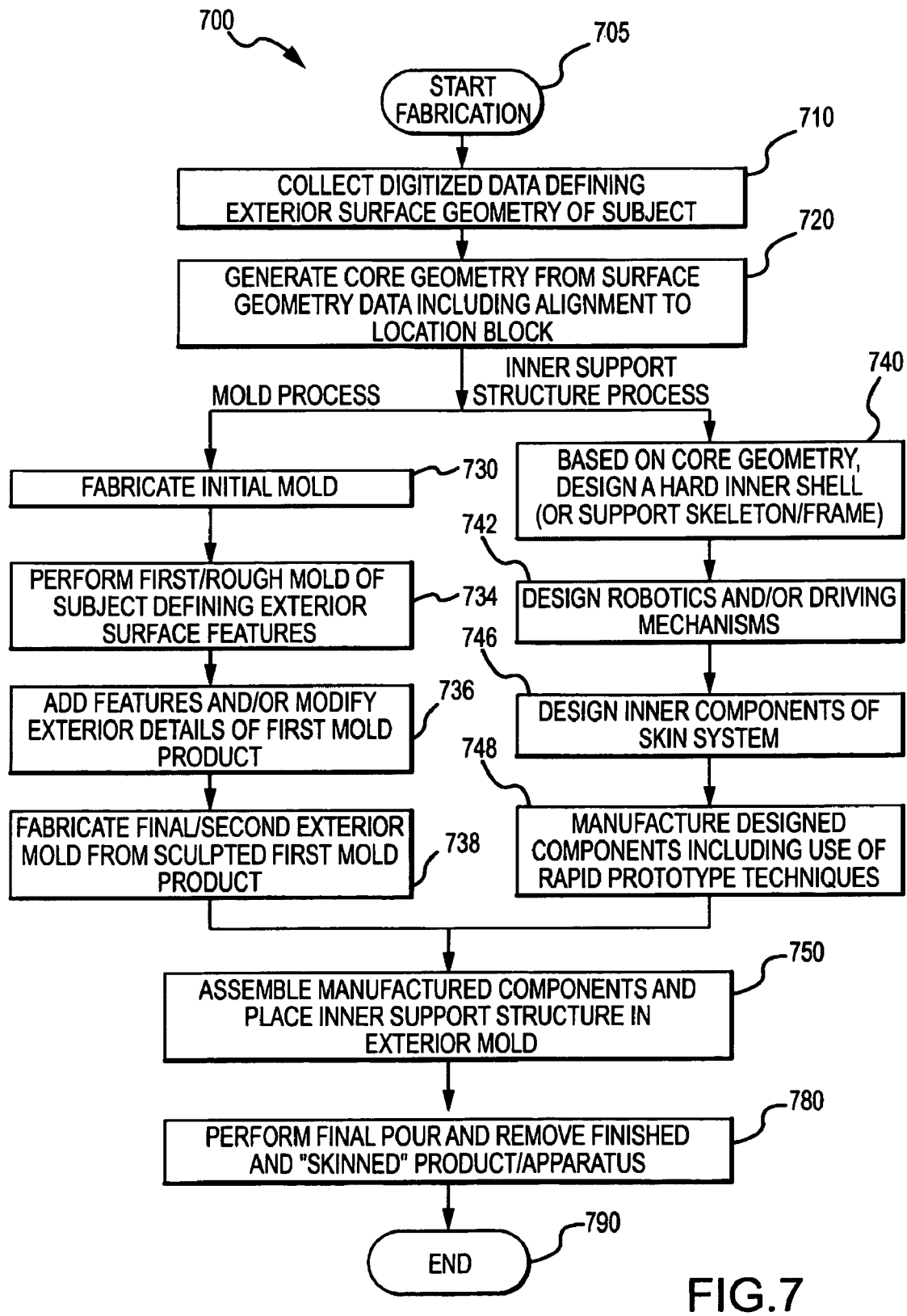
FIG. 7 is a flow diagram of a fabrication method for robotics and other assemblies that include a skin system.

FIG. 7 illustrates a fabrication method 700 that incorporates features of the present invention to facilitate more time efficient, less labor intensive, and less costly design and manufacture of products or assemblies that include an outer skin system. Such products and assemblies may include robotics-based apparatus such as devices used to simulate human, animal, character, or the like movement including facial movements. The following discussion provides examples of using the method 700 for fabricating a robotic head, but, with this example understood, it will be clear that similar steps and techniques may be used for nearly any assembly or object in which a covering or skin system is applied over an inner support structure, frame, or skeleton. The method 700 is particularly well suited for creating skin systems for subjects or base objects such as heads that are viewed from all directions such as for forming a skin system for a robotic head that has no seams or removable panels (e.g., the robotics or drive devices need to be insert through a base (or neck) opening and cannot simply be placed in through a removable panel).

As discussed with reference to FIGS. 1-6, this type of robotic apparatus (e.g., head or the like) generally includes an inner support structure and an exterior skin layer. The inner support structure includes a hard shell or frame, flexible/soft inner skin system components (such as backing for a face and a flexible but somewhat harder/tougher mechanism insertion section or force receiving component), and robotics or drive mechanism that typically mate with and drive part of the inner support structure. The exterior skin layer is created with a final pour around the assembled inner support structure to provide the detailed exterior of the robotic head or other "skinned" product, and the poured exterior skin layer bonds at least with the inner skin component to form the overall skin system. The robotics, such as a mouth driving mechanism or facial emotion/movement device, may be inserted post-final pour such as up through the neck or base opening and fit into place (e.g., to mate with the force receiving portions of the skin system).

At step 705, the fabrication method 700 starts such as with choosing a subject or base object to be modeled (e.g., an existing physical sculpture, a 3D modeled object, or the like) with a robotic device, and, in the following discussion, it is assumed that the subject is a head of a human or character such as shown in FIGS. 2-6. At 710, digitized or digital data defining the exterior surface geometry of the chosen subject is obtained or collected and stored in memory of a computer system or on a memory device. In one embodiment, the surface geometry data for later computer modeling is obtained by using a laser scanner or similar device to scan or process the subject (e.g., person's head, character's head, or the like). The laser scanner produces or outputs point cloud data that can be used directly or after further processing to create a digitized computer model or core geometry of the subject in step 720. For example, the surface geometry data may be imported into a CAD or similar program or tool and processed as necessary to define a core or base geometry. In some embodiments, there is no existing subject or object to scan, and the surface geometry data is formed by importing or creating a 3D computer model defining an exterior surface geometry (e.g., a new character/face for use on a robot or the like).

The surface geometry or subject computer model may be aligned with a predefined location or alignment block (e.g., a computer definition or model of a block with one or more attachment points may be retrieved from memory and attached to the digitized model of the surface geometry of the subject). Alignment of the location block is useful for proper sculpting, molding, casting, and 3D modeling processes and is used in many or all of the later manufacturing/fabricating steps of method 700. The base geometry is later used for producing the inner support structure (such as with an offset for the thickness of the exterior skin layer from the base geometry outer surface) and designing its components (e.g., the core geometry's dimensions and shapes are subdivided into components such as skin system components and the hard shell). Note, if the material that is used to form the exterior skin layer has a known or expected shrink rate, the surface geometry model may be increased in size or scaled upward to account for such shrinkage, and, in some cases, it may be appropriate to use a greater thickness for the skin layer in creating the base geometry.

The method 700 can now proceed along two parallel paths (or these may be done sequentially) including a mold/sculpt process and a design/manufacture of the inner support structure. The design/manufacture process often will involve use of a CAD module or similar tool to design the inner structure components (e.g., items used in the final pour or casting procedure 780), and this parallel process may involve designing mechanisms to provide the robotic functions (e.g., drivers that mate with the soft inner skin system components such as force receiving components). Note, this differs significantly from a more standard robotic fabrication process in which the designer/fabricator typically has to wait for sculpting and molding processes to be complete before they can design internal pieces to mate with products of these processes (e.g., a base geometry is not known beforehand).

Along the mold process path, an initial or first exterior mold is fabricated at 730. This step may include producing a rapid prototype part based upon the core geometry (e.g., an RP head) that is configured to assemble onto a location block (which may be fabricated at 730 but more typically is prefabbed with its dimensions input to the modeling module for use in modeling the base geometry alignment/attachment to such a block/support). The RP head (or otherwise fabricated/prototyped head) is typically not detailed and generally represents the shape of the original subject or head that was scanned in step 710. The RP head/block may be considered a sculpt assembly and this may be provided to and used by a mold maker to form the initial or first exterior mold at 730.

At 734, the sculpt assembly is removed from the first or initial mold and a structure is built or fabricated that mounts to the location block and provides room for receiving pliable/ sculptable material (e.g., a receiving structure for clay or other moldable material). The structure and location block are then placed back into the initial exterior mold. Oil-based clay or other moldable material is heated such as in a double boiler or the like (or otherwise placed in liquid state) and poured into the mold over the receiving structure. The clay is allowed to cool and the structure, block, and clay are removed from the exterior case mold. At 736, the clay shape with the location block is provided to a sculptor or artisan such that features can be added and/or modified to provide desired exterior details. The clay shape or rough mold product is nearly an exact match to the core geometry or exterior surface model, and step 736 often will not involve significant modifications and changes to the exterior surface.

At 738, the method 700 continues with fabricating a final or second exterior mold around the now sculpted product of the first molding process 734 and the attached location block. The exterior mold is removed, and this exterior mold can be used for casting (such as at 780) final cast parts or "skinned" products. Additional location blocks may be machined with the same outside dimensions and mounting locations for supporting inner support structures, and these will each fit in the final exterior mold formed at 738. In practice, the location blocks may have various cutouts, bleed holes, and/or attachments to accept different bracketry and shapes (or inner support structures) to be cast or poured around to form the final product.

Referring now to the parallel steps of fabricating the inner support structure, the core geometry formed in step 720 is used as the main reference to designing the inner support structure and its subparts such as inner portions of the skin system. First, at 740, based on the core geometry a hard inner shell or support structure is designed. This may involve creating an offset model or geometry with the 3D modeling/design module (e.g., a CAD-based tool or the like) by moving inward an offset distance equal to the desired or expected thickness of the exterior skin layer, and again, this offset distance may be selected so as to account for possible shrinkage of the material used in the final pour or casting 780. The structural shell is used in the final assembly or product to house and support the flexible components of the skin system and to support the driving mechanism/robotics used to move the face (or portions of the skin system), and hence, the design of the shell may include removing an area to provide a location and support surfaces for inner skin system components and supports/attachment locations for the robotics.

At step 742, the method 700 includes designing (such as with a CAD or other design/modeling tool or module) the robotics and/or drive mechanisms to be used in the robot head or other finished product such as to provided desired movement such as expressions, mouth motions, and the like. Then, at 746 (or this step may be done prior to step 742), the inner components of the skin system (e.g., the soft backing component and force receiving components shown in FIGS. 2-6 or the like) are designed so as to properly mate with the shell and with the driving mechanism/robotics. In some cases, these components are simply chosen to be portions of the shell (e.g., a section of the offset model created from the core geometry) with features similar to or matching the exterior surface geometry (e.g., ears, nose, lips, eyes, etc but offset a distance to allow for the exterior skin layer thickness). In the example shown in FIGS. 2-6, the inner skin system components include a flexible intermediate section or force receiving component that can attach on one side to the robotics and on its outer side to the flexible exterior skin that will later be poured over it. Because both the exterior skin and the driving mechanism/robotics were designed with the 3D computer modeling tool/module, the force receiving component can readily be designed/defined with the same or similar tool/module by building/filling between the other two previously designed/defined components. Also in the FIGS. 2-6, the robot head example includes a soft, flexible backing component (e.g., a backing portion of the skin system that may be of a lower durometer material or a foamed skin), which functions in the robot head to support portions of the flexible exterior skin. Again, in step 746, the 3D computer modeling/design module may be used to build or form the backing component between or in the space between the force receiving component, the shell receiving surface (or by altering the opening size or shape of the shell with the shell being altered to accommodate this support or backing component), and the exterior skin layer. The design steps at 740 and at 746 involve defining specific shapes and dimensions of every surface of these components, and all this design/modeling data is stored in memory by the 3D computer modeling/design module.

At step 748, the designed components of the inner support structure are manufactured based on the computer models/design definition information. Because the design has been done with a computer modeling program such as a CAD-based design tool, the structural shell and some of the internal mechanism/robotics may be fabricated using rapid prototyping techniques such as fuse deposition modeling (FDM) or the like, which decreases hand labor and, therefore, costs and also provides repeatable fabrication/duplication of these components. Further, some of the components will be cast or molded such as using liquid silicone or the like for skin system components. To this end, the designed inner skin system components (or their digitized model(s) and related data) are used in step 748 to design and fabricate molds for these components. Also, because the design is typically performed using parametric CAD software or the like, changes can be made to the components of the inner support structure and all neighboring, related, or effected components are typically also updated or modified to suit these changes (and, in some cases, the molds for these changed parts are also automatically changed), which leads to simplified and efficient design changes and prototyping iterations. The molds, as well as the structural shell, may be created (or printed) using rapid prototype machines, with differing machines being used depending on the strength and surface detail required. From the printed molds, the inner support structure components are cast to have a desired flexibility/hardness and the like.

At 750, the method 700 continues with assembling of the components formed in step 748 to form the inner support structure (typically without the robotics). As discussed with reference to FIGS. 2-6, the structural shell, the flexible movement/backing component(s), and the force receiving component(s) may be bonded together with adhesive to keep the parts together during the final pour process 780. This assembled inner support structure is mounted upon a location block and then placed within the exterior mold from step 738 with the location block mating with the outer walls of the mold to align the inner support structure within the mold cavity. In some embodiments, brackets or bracketry is also made and provided to further support and align the force receiving and/or other components of the skin system that may tend to move during the final pour without additional support. The bracketry may also be mounted to the location block, and it is provided due to the pressure/forces introduced into the mold during the final casting process 780 to align the components initially and to retain them when under pressure/forces.

At 780, the final pour is performed to form the exterior skin layer of the skin system. Silicon or a similar material is poured into the mold around the assembled inner support structure, and a single bonded skin system is formed as the exterior skin layer material bonds with the inner skin system components provided in the inner support structure, and the shell provides mechanical/structural support of the flexible skin (e.g., similar to a skull or other skeleton/frame). The "skinned" product or robot head is removed from the mold, and, in some cases, the drive mechanism or robotics are installed by removing the location block and inserting the robotics up into the head through the neck opening, with the robotics connected to the force receiving component and, as needed, to the structural shell on receiving shelves/ledges or the like. The final pour at 780 is useful for both picking up the detail of the sculpture or subject and also to provide a final bond of all the components of the robot head or other "skinned" object. The method 700 then ends at 790 or is started again at 705 such as with selecting a new subject or target object for use in the fabrication method 700.

Figure 8:
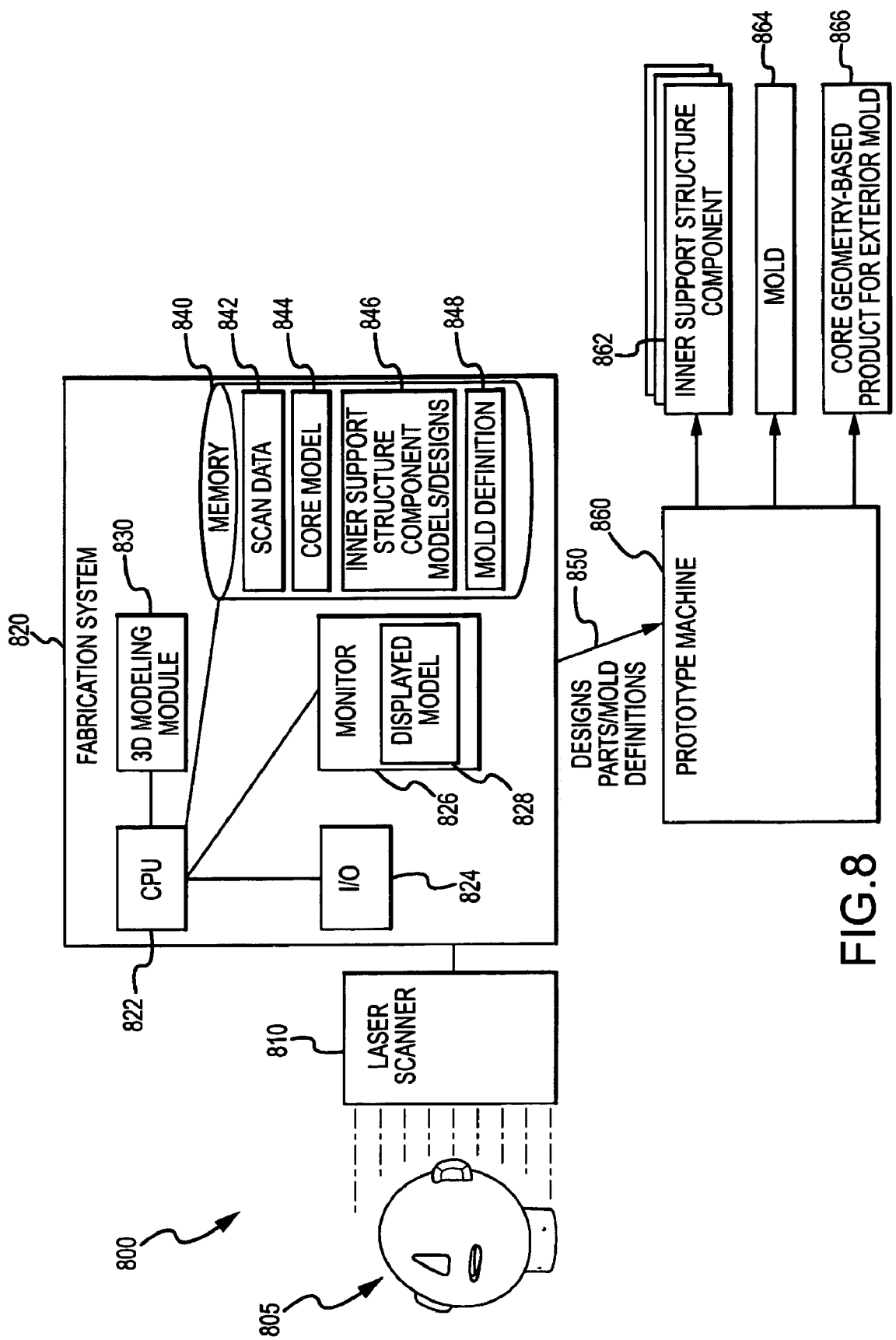
FIG. 8 is a functional block diagram of a computer-based system for designing/modeling a robotic device or other product that includes an inner support structure and an outer skin system.

FIG. 8 illustrates a computer-based design system 800 for use in producing a skinned object such as a robotic head or other assembly/structure that is covered with a skin system. As shown, a subject or base object 805 is selected such as a sculpted object, e.g., a human, animal, or character head or other body parts. The system 800 includes a scanner 810 that operates to determine the exterior surface dimensions and/or geometry of the subject 805 and this information (e.g., cloud data or the like) is transferred to a communicatively-linked fabrication system 820 where it is stored as scan data 842 in memory 840. The system 820 may take the form of a conventional computer device such as a handheld, laptop, notebook, desktop, or other computer. The system 820 typically includes a processor 822 that controls operation of input/output devices 824 (such as keyboards, mice, joysticks, touch screens, voice controls, and the like) as well as a monitor 826 that may be operated to display a GUI and/or as shown a model 828 that is being created and designed by the system 820. The CPU 822 further runs a 3D modeling module, tool, or software program/application 830 such as a CAD-based tool or the like.

The module 830 acts to process the scan data 842 (as discussed with reference to method 700 of FIG. 7) to create a core or base model 844 that defines, at least generally, a 3D model of the subject 805. The module 830 may further function to output this definition as shown at 850 to a prototype machine 860 such as an FDM machine or the like for use in fabricating a core geometry-based product 866, which may then be used in creating an exterior mold(s) for producing an exterior skin layer. The module 830 may also be used, such as with input/interaction with a designer via I/O 824 and monitor 826, to design and model an inner support structure and its components (e.g., a hard shell/frame, soft skin components to be provided on such frame to be exposed to later-poured exterior skin, and, optionally, robotics/drive mechanisms to mate with the shell and/or inner skin components). Such modeling is performed based on the base model 844 (e.g., with an offset for the skin thickness of exterior layer but using scanned surface geometry data 842). The 3D modeling module 830 may output 850 this data 846 to a prototype machine 860 for use in fabricating all or some of the inner support structure components (such as the hard shell and portions of the robotics) 862. Further, the 3D modeling module 830 may be operated by the processor 822 to allow a designer to prepare mold definitions 848 based on the designs/models 846 of the inner support structure components such as soft backing components or force receiving components. These mold definitions or mold data 848 can be exported/transmitted 850 to one or more types of prototype machines 860 for production of molds 864, which in turn may be used to cast these components for use in the inner support structure assembly.

Figure 9:
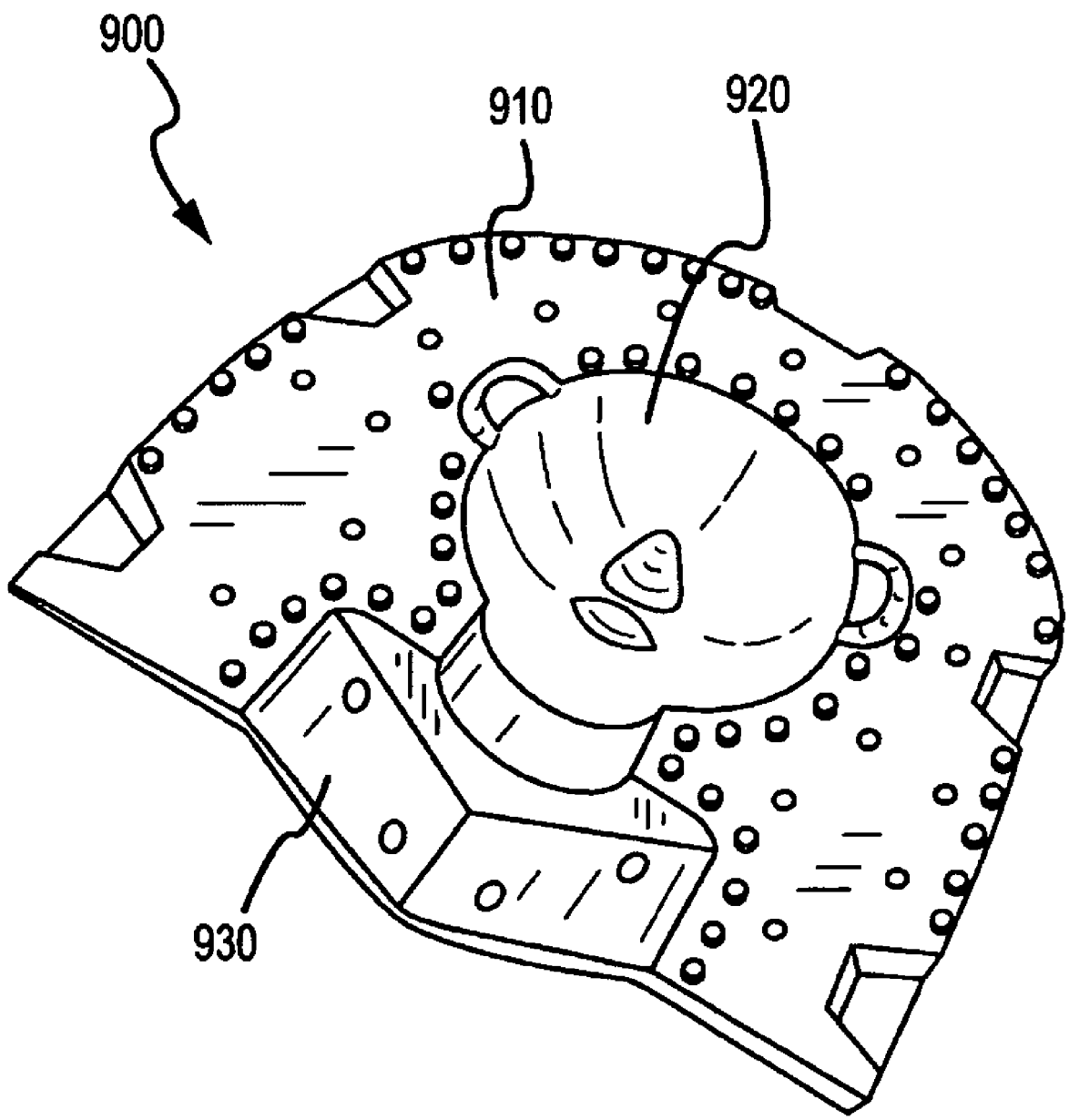
FIGS. 9-11 illustrate an exterior skin mold and its use as part of a skin fabrication process including placement of an assembled inner support structure.
Figure 10:
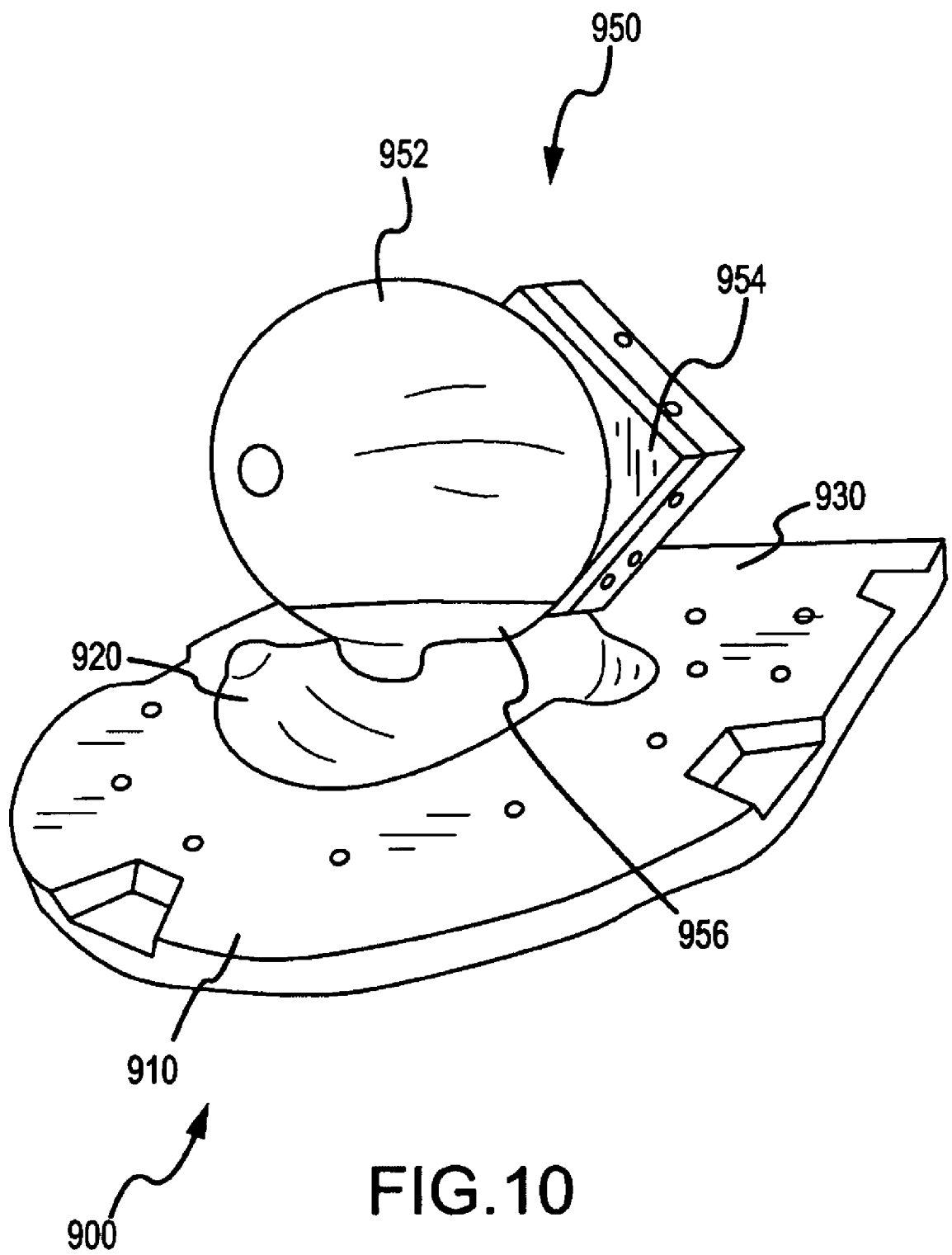
Figure 11:
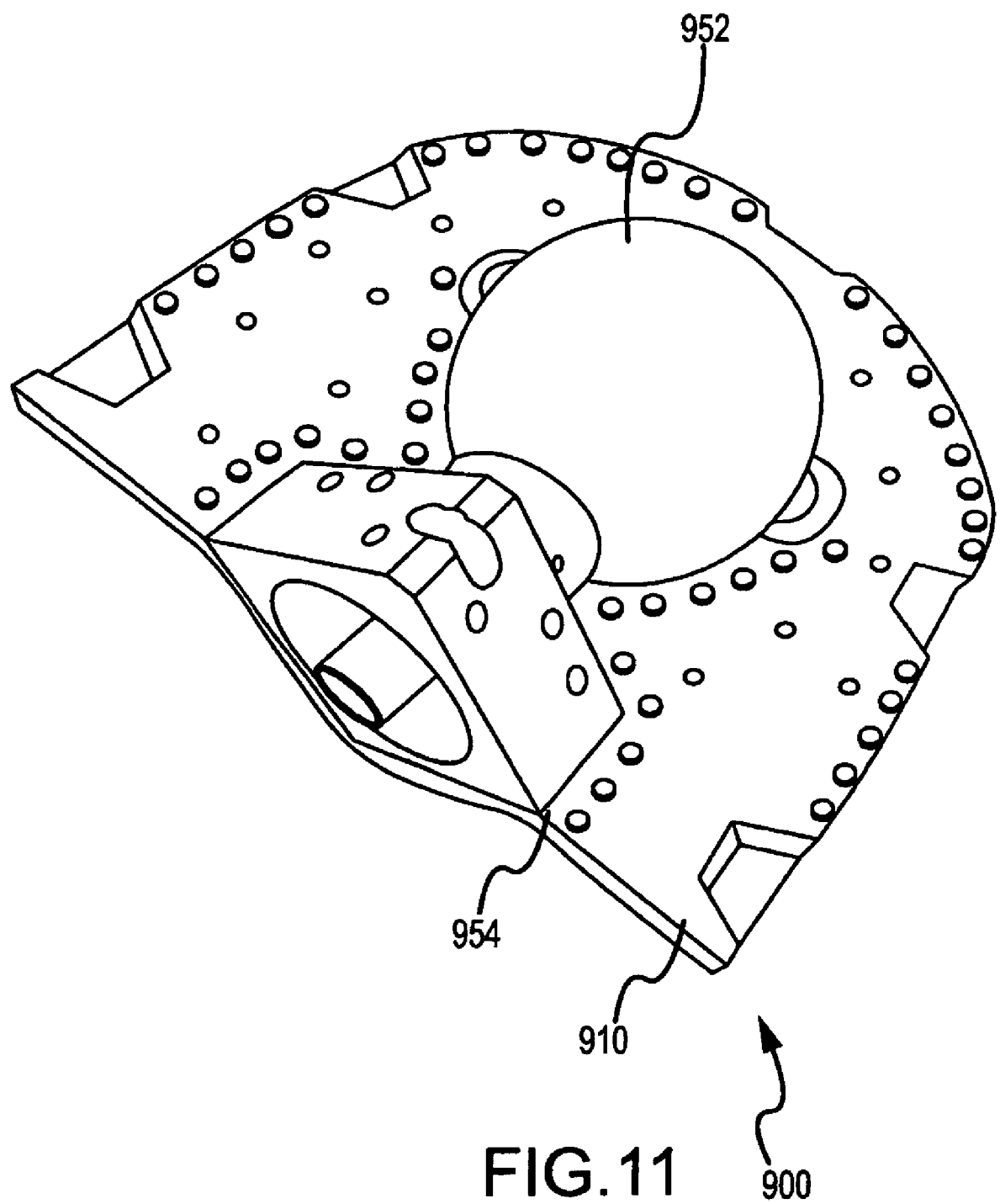

FIGS. 9-11 illustrate an exterior skin mold 900 and its use during a portion of a skin fabrication process of the invention. As shown in FIG. 9, the mold 900 includes two halves or sidewalls with a front sidewall 910 shown, and, in this example, the main cavity 920 includes features of an exterior surface geometry of a subject (such as a face/head). The surface geometry provided by the cavity 920 would be formed, as discussed above, by first fabricating (such as with rapid prototyping or the like) a model/sculpt based on a core geometry definition (e.g., based on scanned data of an original object or subject that is then modeled or processed into the definition by a 3D modeling program or the like). The front sidewall 910 further includes a recessed surface 930 for receiving a location or alignment block, structure, member, or element, which is used to align an inner support structure relative to the surfaces of the cavity 920 (e.g., to space the shell and inner skin components a particular offset or distance away to provide room for the exterior skin pour), and the alignment recess 930 is provided in the mold sidewall 920 by creating the mold 900 using a sculpt assembly formed based on the core geometry that is mated with/mounted upon a location block.

FIG. 10 illustrates the step of the fabrication process in which an inner support structure 950 is positioned within the cavity 920 and alignment recess 930 portions of the mold sidewall 910. Specifically, a structural shell 952 with an inner skin component (e.g., soft backing component) 956 attached is placed proximate—but offset a distance for the skin layer—from the surface of cavity 920 of wall 910. The shell 952 and skin component 956 is positioned accurately in the cavity 920 by mating the alignment/location block 954 (and, in some case, fastening with one or more fasteners) to the recess 930 in sidewall/mold half 910. FIG. 11 illustrates the mold 900 with the alignment block 954 and shell 952 of the inner support structure 950 positioned in the mold sidewall/half 910. A small space such as 0.125 to 0.25 inches is provided about the shell 952 to allow liquid silicone or other flexible material with a desired hardness to flow. The final pour or casting step is performed after another half or sidewall (not shown) is mated to the sidewall 910, and the mold 900 is configured with flow paths for the final pour. In the illustrated example, the exterior skin would flow about the entire head (or shell) 952 and neck but would be blocked from flowing about the block 954. In other embodiments, the exterior skin may only cover a portion of the shell 952 and/or skin components 956.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. The above examples have provided examples of using skin systems of the invention with robotics, but the skin or covering systems of the invention are, of course, readily adaptable and useful in other applications in which it is desirable to cover a still or rigid frame or support structure or a dynamic or movable frame or support structure such as with materials having two or more hardnesses or differing flexibility and/or durability. As a result, the use of the term "skin" is not intended as being limited to human or animal imitating robots, toys, or devices, but it is instead to be inclusive of nearly any covering assembly or layered overlay that may be applied to or used as a covering (typically, but not always, an external covering).

The fabrication method may use a variety of rapid prototyping techniques once the core geometry model is created and inner support structure components are designed and/or modeled such as using a CAD-based 3D computer modeling program/routine. One useful rapid prototyping technique that may be used to form inner support structure components or molds to facilitate casting of such parts is fused deposition modeling (FDM). In FDM, plastic parts may be manufactured by depositing or printing a filament on a layer by layer basis directly from 3D CAD or other modeling/design data (e.g., a file(s) containing geometric models or the like formed with a 3D CAD workstation or the like) provided to an FDM machine/device. For example, semi-liquid thermoplastic material (ABS) may be extruded and then deposited in thin layers from an FDM head one layer (or slice) at a time. The parts formed with FDM may have a rough surface finish, but this is typically acceptable for inner skin components and other parts such as the hard structural shell and robotics components. In other embodiments, rapid injection molding is utilized for some of the components, and this involves providing the 3D CAD part models to a rapid prototyping system that automates the process of manufacturing molds based on such models (e.g., by producing molds using aluminum or other alloys or materials and using precise, high-speed CNC machining such as three-axis CNC milling or other techniques).

We claim:

1. A method for fabricating a product with an artificial skin system, comprising:
    creating a prototype of the product based on a 3D base geometry model of at least one exterior surface of the product;
    forming an exterior skin mold using the product prototype mounted on an alignment block, wherein a recess matching the alignment block is formed in the exterior skin mold;
    fabricating an inner support structure based on the 3D base geometry model, wherein the inner support structure has an exterior geometry selected to be smaller than the 3D base geometry model by an offset distance;
    positioning the inner support structure within the exterior skin mold, wherein the inner support structure is mounted upon the alignment block and the alignment block is received in the matching recess in the exterior skin mold to align the inner support structure with the exterior skin mold; and
    filling material for an exterior skin layer into the mold to occupy a cavity between the inner support structure and the exterior skin mold.

2. The method of claim 1, further comprising prior to the creating of the prototype:
    providing a set of digital data in memory that defines a geometry of the exterior surface of the product and a set of digital data in the memory defining a model of the alignment block; and
    with a modeling tool running on a computer, generating the 3D base geometry model of the product based on the exterior surface geometry data set, wherein the 3D base geometry model is configured for mounting on the model of the alignment block and wherein the alignment block is fabricated based on the model of the alignment block.

3. The method of claim 1, wherein the forming of the exterior skin mold comprises first forming an initial mold using the product prototype, creating a sculpt assembly in the initial mold, modifying the sculpt assembly by sculpting to add or alter features, and second forming the exterior skin mold using the modified sculpt assembly.

4. The method of claim 1, wherein the fabricating of the inner support structure comprises modeling with the modeling tool a structural shell with an exterior shape at least partially matching the 3D base geometry accounting for the offset distance, the structural shell comprising an outer wall defining an interior void space.

5. The method of claim 4, wherein the fabricating of the inner support structure further comprises designing with the modeling tool at least one inner skin component positioned in an opening in the outer wall of the structural shell and forming the inner skin component from an elastomeric material to destructively bond with the material of the exterior skin layer during or after the filling step.

6. The method of claim 5, wherein the forming of the inner skin component comprises creating a model of a mold for the inner skin component with the modeling tool and wherein the mold and the structural shell are manufactured by providing the mold model and structural shell model to a rapid prototype machine that is operated to fabricate the inner skin component mold and the structural shell.

7. The method of claim 6, wherein the fabricating of the inner support structure further comprises providing a drive mechanism configured for mating with the inner skin component and for positioning in the void space of the structural shell and wherein the fabricating of the inner support structure comprises bonding the inner skin component to the structural shell.

8. The method of claim 7, wherein the material of the inner skin component is harder than the material of the exterior skin layer after setting to provide a force receiving component and wherein the filling comprises providing a volume of material over the force receiving component, whereby an inner surface of the exterior skin component is integrally bonded to the force receiving component as the material solidifies.

9. The method of claim 1, wherein the offset distance is selected to define a thickness of the exterior skin layer and wherein the inner support structure comprises at least one inner skin component bonding with the material of the exterior skin layer and having a differing hardness than the exterior skin layer upon solidification of the exterior skin layer.

10. A computer-based method for fabricating an object with an exterior skin, comprising:
    storing in memory a 3D base geometry model defining surface geometry of the object and a model of an inner support structure, wherein the inner support structure comprises a structural shell;
    fabricating the inner support structure including the structural shell based on the inner support structure model;
    fabricating an exterior skin mold based on the 3D base geometry model; and
    forming the exterior skin over the inner support structure by positioning the inner support structure in the exterior skin mold and filling the exterior skin mold with one or more materials,
    wherein the one or more materials comprise an elastomer, wherein the inner support structure further comprises an inner skin component positioned on an exterior surface of the structural shell, and wherein the inner skin component is fabricated based on the inner support structure model.

11. The method of claim 10, wherein the inner skin component is formed of an elastomer with a differing hardness than the formed exterior skin and wherein an inner surface of the exterior skin is destructively bonded to the inner skin component.

12. The method of claim 10, wherein the storing step comprises scanning the surface geometry of the object and forming the 3D base geometry model from results of the scanning and wherein the inner support structure model is generated with a computer modeling module run on a computer and offsetting the inner support structure outer surfaces from the 3D base geometry model.

13. The method of claim 12, wherein the method further comprises operating a rapid prototype machine to output the structural shell and a mold designed based on the modeled inner skin component.

14. The method of claim 12, wherein the 3D base geometry model is positioned on a model of an alignment block by the computer modeling module and wherein the exterior skin mold includes a recess for receiving the alignment block and the fabricated inner support structure is placed on the alignment block prior to positioning in the exterior skin mold.

15. A method of fabricating an object covered with a multi-hardness skin system, comprising:

creating a 3D computer model defining surface geometry of the object;

modeling an inner support structure for the object based on the 3D computer model of the object, the inner support structure model comprising a structural shell and a backing component on an exterior surface of the structural shell;

fabricating the inner support structure including molding the backing component with an outer surface using a mold fabricated based on the inner support structure model, the molded backing component comprising an elastic material with a first hardness;

fabricating an exterior skin mold for the object based on the 3D computer model of the object;

positioning the fabricated inner support structure within the exterior component mold;

filling the exterior skin mold with a material; and allowing the material to harden to form the exterior skin bonded to an outer surface of the backing component, wherein the exterior skin has a second hardness that differs from the first hardness.

16. The method of claim 15, wherein the creating of the 3D computer model comprises first laser scanning exterior portions of the robot head and second operating a 3D modeling module to process data from the laser scanning to form the 3D computer model.

17. The method of claim 16, wherein the modeling of the inner support structure comprises using the 3D modeling module to form a model with similar exterior surface topology as the robot head and offset a distance of about a thickness of the exterior skin from the 3D computer model of the object.

18. The method of claim 15, wherein the modeling of the inner support structure includes modeling with the 3D modeling module a drive mechanism for mating with a force receiving component, the force receiving component being provided on the exterior surface of the shell and mating with the backing component during assembly of the inner support structure.

19. The method of claim 15, further comprising mounting the backing component onto the shell prior to the positioning of the inner support structure within the exterior skin mold, wherein the exterior skin extends over the backing component and at least partially over the rigid shell and wherein the inner support structure is mounted onto a location element prior to positioning in the exterior skin mold, the location element mating with a recess in the exterior skin mold to align the inner support structure within a cavity of the mold.

20. The method of claim 15, wherein the fabricating of the exterior skin mold comprises creating a rapid prototype part based upon the 3D computer model, forming an initial mold using the rapid prototype part, casting a sculpting assembly in the initial mold, modifying exterior surfaces of the sculpting assembly to change features of the object, and forming the exterior skin mold using the modified sculpting assembly.

* * * * *